US007278394B2

(12) United States Patent
Okazaki et al.

(10) Patent No.: US 7,278,394 B2
(45) Date of Patent: Oct. 9, 2007

(54) AIR-FUEL-RATIO CONTROL APPARATUS FOR INTERNAL COMBUSTION ENGINE

(75) Inventors: Shuntaro Okazaki, Susono (JP); Naoto Kato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/637,116

(22) Filed: Dec. 12, 2006

(65) Prior Publication Data

US 2007/0131208 A1 Jun. 14, 2007

(30) Foreign Application Priority Data

Dec. 14, 2005 (JP) ............................ 2005-359810

(51) Int. Cl.
*F02D 41/14* (2006.01)
*G06F 17/00* (2006.01)

(52) U.S. Cl. ...................... 123/305; 123/694; 123/109; 60/276

(58) Field of Classification Search ................ 123/305, 123/694, 697, 700, 704, 431, 478, 480; 60/274, 60/276, 277, 285; 701/103, 109
See application file for complete search history.

(56) References Cited

U.S. PATENT DOCUMENTS 5,475,975 A 12/1995 Nasu
5,762,055 A * 6/1998 Yamashita et al. .......... 123/677
5,901,691 A * 5/1999 Katoh ........................ 123/688
6,619,277 B2 * 9/2003 Katoh ........................ 123/672
7,013,873 B2 * 3/2006 Oomori ...................... 123/431
7,032,374 B2 4/2006 Okazaki et al.
7,159,388 B2 * 1/2007 Nakagawa et al. ........... 60/285

FOREIGN PATENT DOCUMENTS

JP A 64-60746 3/1989
JP A 6-213039 8/1994
JP A 2002-47980 2/2002
JP A 2004-183585 7/2004

* cited by examiner

*Primary Examiner*—Stephen K. Cronin
*Assistant Examiner*—Johnny H. Hoang
(74) *Attorney, Agent, or Firm*—Oliff & Berridge, PLC

(57) ABSTRACT

The air-fuel-ratio control apparatus for an internal combustion engine obtains an upstream-side feedback correction value DFi for feedback-controlling an air-fuel ratio on the basis of a value (Fcrlow(k−N)) that is obtained by performing a low-pass filter process with a time constant τ to a value corresponding to an upstream-side target air-fuel ratio abyfr at the time point a dead time, which corresponds to the period from a time when the instruction for injecting fuel to the time when exhaust gas generated based up on a combustion of the fuel reaches an upstream air-fuel-ratio sensor 66, before the present point in time, and a value (Fc(k−N)) corresponding to an output value Vabyfs from the upstream air-fuel-ratio sensor 66 at the present time. The time constant τ of the low-pass filter process is set to a value equal to the time constant of the response delay of the upstream air-fuel-ratio sensor 66.

10 Claims, 13 Drawing Sheets

(A) Target air-fuel ratio
(B) Base fuel injection quantity
(C) Output value from upstream air-fuel-ratio sensor
(D) Target cylinder fuel supply quantity
(E) Upstream-side feedback correction value (A) Target air-fuel ratio
(B) Base fuel injection quantity
(C) Output value from upstream air-fuel-ratio sensor
(D) Target cylinder fuel supply quantity
(E) Upstream-side feedback correction value

AIR-FUEL-RATIO CONTROL APPARATUS FOR INTERNAL COMBUSTION ENGINE

BACKGROUND OF THE INVENTION

1. Field of the Invention

The present invention relates to an air-fuel-ratio control apparatus for an internal combustion engine, which apparatus is applied to an internal combustion engine provided with an upstream air-fuel-ratio sensor disposed in an exhaust passage to be located upstream of a catalyst unit disposed in the exhaust passage, and feedback-controls the air-fuel ratio (hereinafter referred to as "air-fuel ratio") of the gas mixture supplied to the internal combustion engine on the basis of the output of the upstream air-fuel-ratio sensor.

2. Description of the Related Art

For example, Japanese Patent Application Laid-Open (kokai) No. 2004-183585 discloses a conventional air-fuel-ratio control apparatus of such a type. In the disclosed air-fuel-ratio control apparatus for an internal combustion engine (hereinafter sometimes simply referred to as "engine"), a target air-fuel ratio is determined on the basis of the operation state of the engine. An upstream-side feedback correction value is calculated on the basis of the value corresponding to the deviation of the air-fuel ratio (detected air-fuel ratio), which corresponds to the output value from the upstream air-fuel ratio sensor, from the target air-fuel ratio (specifically, the deviation of the value (detected cylinder fuel supply quantity), which is obtained by dividing a cylinder intake air quantity by the detected air-fuel ratio, from the value (target cylinder fuel supply quantity), which is obtained by dividing the cylinder intake air quantity by the target air-fuel ratio). A fuel injection quantity is calculated on the basis of the upstream-side feedback correction value and a base fuel injection quantity, which is a quantity of fuel for obtaining the target air-fuel ratio, and the instruction for injecting the fuel in the fuel injection quantity is given to an injector, whereby the air-fuel ratio is feedback-controlled.

Meanwhile, when the target air-fuel ratio changes, the fuel injection quantity (accordingly, air-fuel ratio) changes due to the change of the base fuel injection quantity. In general, it takes a predetermined time (hereinafter referred to as "dead time") for the exhaust gas generated upon the combustion of the fuel to reach the upstream air-fuel-ratio sensor from the time when the instruction for injecting fuel. Accordingly, the change in the air-fuel ratio appears as the change in the detected air-fuel ratio with the delay of the dead time. Thus, when the target air-fuel ratio changes, the detected air-fuel ratio (accordingly, detected cylinder fuel supply quantity) changes with the delay of the dead time.

On the other hand, when the target air-fuel ratio changes, the target cylinder fuel supply quantity immediately changes. Therefore, the timing of the change in the target cylinder fuel supply quantity does not coincide with the timing of the change in the detected cylinder fuel supply quantity. Accordingly, when the deviation of the detected cylinder fuel supply quantity from the target cylinder fuel supply quantity itself (current value) is used as the aforesaid deviation, the deviation (accordingly, the upstream-side feedback correction value) temporarily increases, whereby there may be the case in which relatively great fluctuation is produced in the air-fuel ratio. This is unpreferable for promptly converging the air-fuel ratio to the target air-fuel ratio.

In view of this, in the disclosed apparatus, the target cylinder fuel supply quantity at the point the dead time before the present point in time is used, instead of the target cylinder fuel supply quantity itself, in order that the timing of the change in the target cylinder fuel supply quantity coincides with the timing of the change in the detected cylinder fuel supply quantity, upon calculating the aforesaid deviation (accordingly, the upstream-side feedback correction value).

The air-fuel-ratio control apparatus disclosed in the aforesaid application entails, however, the problem described below. The case in which the target air-fuel ratio sharply changes (e.g., the case in which the target air-fuel ratio changes in a stepwise manner) is now considered. In this case, the target cylinder fuel supply quantity sharply changes the dead time after the point when the target air-fuel ratio sharply changes. On the other hand, since the upstream air-fuel-ratio sensor has a response delay, the detected cylinder fuel supply quantity relatively gently changes with the response delay the dead time after the point when the target air-fuel ratio sharply changes.

Specifically, although the timing of the change in the target cylinder fuel supply quantity and the timing of the change in the detected cylinder fuel supply quantity coincides with each other, the degree of the delay of the respective changes greatly differ from each other after the timing of the change. Therefore, the upstream-side feedback correction value might still temporarily increase, resulting in entailing a problem that it is difficult to promptly converge the air-fuel ratio to the target air-fuel ratio.

SUMMARY OF THE INVENTION

Accordingly, an object of the present invention is to provide an air-fuel-ratio control apparatus that feedback-controls the air-fuel ratio through the calculation of the fuel injection quantity, on the basis of the target air-fuel ratio and the output value from the upstream air-fuel-ratio sensor, in such a manner that the air-fuel ratio coincides with the target air-fuel ratio, wherein even if the target air-fuel ratio sharply changes, the air-fuel ratio can promptly be converged to the target air-fuel ratio.

The air-fuel-ratio control apparatus according to the present invention is applied to an internal combustion engine provided with a catalyst unit, upstream air-fuel-ratio sensor, and fuel injecting means (e.g., injector) that injects fuel in response to the instruction.

The present invention provides an air-fuel-ratio control apparatus including: target air-fuel ratio determining means that determines the target air-fuel ratio; base fuel injection quantity acquiring means that acquires the base fuel injection quantity; first delay processing means that acquires a value corresponding the target air-fuel ratio which is determined at the point the dead time before the present point in time; second delay processing means that acquires a value obtained by performing a low-pass filter process to the value acquired by the first delay processing means; upstream-side feedback correction value calculation means that calculates the upstream-side feedback correction value on the basis of the value acquired by the second delay processing means and the output value from the upstream air-fuel-ratio sensor; fuel injection quantity calculation means that calculates the fuel injection quantity; and air-fuel-ratio control means that feedback-controls the air-fuel ratio of gas mixture, which is supplied to the internal combustion engine, by giving the instruction for injecting the fuel in the calculated fuel injection quantity to the fuel injecting means.

Here, the target air-fuel ratio is preferably set to the stoichiometric air-fuel ratio except for the special cases such as immediately after the discontinuation of the fuel supply to the combustion chamber is canceled. Examples of the "value corresponding to the target air-fuel ratio" include the target air-fuel ratio itself, the output value from the upstream air-fuel-ratio sensor corresponding to the target air-fuel ratio, and the value (target cylinder fuel supply quantity) obtained by dividing the cylinder intake air quantity by the target air-fuel ratio.

The upstream-side feedback correction value calculation means is preferably configured to calculate the upstream-side feedback correction value on the basis of the deviation between the value acquired by the second delay processing means and the value corresponding to the output value from the upstream air-fuel-ratio sensor.

Here, examples of the "deviation between the value acquired by the second delay processing means and the value corresponding to the output value from the upstream air-fuel-ratio sensor" include, but are not limited thereto, a deviation between the value obtained by performing the low-pass filter process to the output value from the upstream air-fuel-ratio sensor, which the output value corresponds to the target air-fuel ratio determined at the point the dead time before the present point in time and the output value from the upstream air-fuel-ratio sensor, a deviation between the value obtained by performing the low-pass filter process to the target air-fuel ratio, which is determined at the point the dead time before the present point in time, and the detected air-fuel ratio, and a deviation between the value obtained by performing the low-pass filter process to the target cylinder fuel supply quantity at the point the dead time before the present point in time, which target cylinder fuel supply quantity is the value obtained by dividing the cylinder intake air quantity by the target air-fuel ratio that is determined at the point the dead time before the present point in time, and the detected cylinder fuel supply quantity that is the value obtained by dividing the cylinder intake air quantity by the detected air-fuel ratio.

By virtue of the aforesaid configuration, the value acquired by the second delay processing means (e.g., target cylinder fuel supply quantity) and the value corresponding to the output value from the upstream air-fuel-ratio sensor (e.g., detected cylinder fuel supply quantity) are used for calculating the upstream-side feedback correction value. The value acquired by the second delay processing means is the value obtained by performing the low-pass filter process to the value corresponding to the target air-fuel ratio at the point the dead time before the present point in time.

Accordingly, like the apparatus disclosed in the above-mentioned application, the timing of the change in the value acquired by the second delay processing means and the timing of the change in the value corresponding to the output value from the upstream air-fuel-ratio sensor can coincide with each other. In addition, the degree of the response delay caused by the low-pass filter process is matched to the degree of the response delay of the upstream air-fuel-ratio sensor, whereby the degree of the delay of the change in the value acquired by the second delay processing means and the degree of the delay of the change in the value corresponding to the output value from the upstream air-fuel-ratio sensor after the timing of the change can be matched to each other. Therefore, even if the target air-fuel ratio sharply changes (e.g., even if the target air-fuel ratio changes in a stepwise manner), the temporal increase of the upstream-side feedback correction value can be suppressed, with the result that the air-fuel ratio can promptly be converged to the target air-fuel ratio.

In the air-fuel-ratio control apparatus according to the present invention, the first delay processing means is preferably configured to change the dead time in accordance with the operation state of the internal combustion engine. In general, the dead time changes according to the operation state of the engine. Therefore, since the dead time can correctly be acquired regardless of the operation state of the engine according to the above-mentioned configuration, the timing of the change in the value acquired by the second delay processing means and the timing of the change in the value corresponding to the output value from the upstream air-fuel-ratio sensor can precisely be coincided with each other.

Further, the first delay processing means is preferably configured to use, as the operation state of the internal combustion engine, the operation speed of the internal combustion engine and quantity (cylinder intake air quantity) of air taken in the combustion chamber of the internal combustion engine. Examples of a factor, in the operation state of the engine, that greatly affects the dead time, include the operation speed of the engine and the cylinder intake air quantity. Therefore, the dead time can more precisely be acquired according to the foregoing configuration.

The first delay processing means is preferably configured to use, as the point the dead time before, the point, which the instruction for injecting fuel is issued, before the present point in time by the number of times of the instruction for fuel injection that corresponds to the dead time, and to determine the number of times of the instruction for fuel injection that corresponds to the dead time on the basis of the operation speed and the intake air quantity of the internal combustion engine.

As described above, the dead time is greatly affected by the operation speed of the engine and the cylinder intake air quantity. On the other hand, the number of times of the instruction for fuel injection (the number of times of fuel injection) over the dead time is greatly affected by the cylinder intake air quantity but hardly affected by the operation speed of the engine. Therefore, even if the detected error is included in the operation speed of the engine, the foregoing configuration can prevent the increase, caused by the detected error, in the error (accordingly, the error included in the dead time) included in the number of times of the instruction for fuel injection corresponding to the dead time.

When the point, which the instruction for injecting fuel is issued, before the present point in time by the number of times of the instruction for fuel injection that corresponds to the dead time, is used as the point the dead time before the present point in time, the first delay processing means may be configured to determine the number of times of the instruction for fuel injection corresponding to the dead time based only upon the cylinder intake air quantity.

This configuration makes it possible to create a table (map), etc. that has, as an argument, a single factor greatly affecting the number of times of instruction for fuel injection corresponding to the dead time and that is used for determining the above-mentioned number of times. Accordingly, the labor required for creating the table, etc. can be reduced, and the load of a CPU required for searching the table, etc. can be reduced.

In the air-fuel-ratio control apparatus according to the present invention, the second delay processing means is preferably configured to change a parameter (e.g., time constant of the low-pass filter process) relating to the responsiveness of the low-pass filter process in accordance with the operation state of the internal combustion engine. In general, the degree of the response delay of the upstream air-fuel-ratio sensor changes in accordance with the operation state of the engine. Accordingly, the aforesaid configuration makes it possible to match the degree of the response delay caused by the low-pass filter process to the degree of the response delay of the upstream air-fuel-ratio sensor, in spite of the operation state of the engine. As a result, it is possible to match the degree of the delay of the changes in the value acquired by the second delay processing means caused by the change in the target air-fuel ratio with the degree of the delay of the changes in the value corresponding to the output value from the upstream air-fuel-ratio sensor caused by the change in the target air-fuel ratio, after the timing of the respective changes regardless of the operation state of the engine.

In this case, the second delay processing means is preferably configured to use, as the operation state of the internal combustion engine, the operation speed of the internal combustion engine and the cylinder intake air quantity. The degree of the response delay of the change in the output value from the upstream air-fuel-ratio sensor is greatly affected by the cylinder intake air quantity and also affected by the operation speed of the engine. Therefore, the aforesaid configuration makes it possible to precisely determine the parameter, relating to the responsiveness of the low-pass filter process, for matching the degree of the response delay caused by the low-pass filter process to the degree of the response delay of the upstream air-fuel-ratio sensor.

The second delay processing means may be configured to use only the cylinder intake air quantity as the operation state of the internal combustion engine. This configuration makes it possible to create a table (map), etc. that has, as an argument, a single factor greatly affecting the degree of the response delay of the upstream air-fuel-ratio sensor and that is used for determining the parameter relating to the responsiveness of the low-pass filter process. Accordingly, the labor required for creating the table, etc. can be reduced, and the load of a CPU required for searching the table, etc. can be reduced.

The second delay processing means may also preferably be configured to use a second-order delay process as the low-pass filter process. By virtue of this configuration, the characteristic of the delay of the change in the value acquired by the second delay processing means can be precisely made close to the characteristic of the delay of the change in the output value from the upstream air-fuel-ratio sensor in the event that the target air-fuel ratio changes (accordingly, in the event that the fuel injection quantity changes).

The second delay processing means may also preferably be configured to use a first-order delay process as the low-pass filter process. By virtue of this configuration, the number of parameters that relate to the responsiveness of the low-pass filter process and that needs adaptation decreases, compared to the case where the second-order delay process is used. Accordingly, the labor required for the adaptation of the parameters can be reduced, and the load of a CPU required for determining the value of the parameter can be reduced.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Embodiments of an air-fuel-ratio control apparatus for an internal combustion engine according to the present invention will be described with reference to the drawings.

Figure 1:
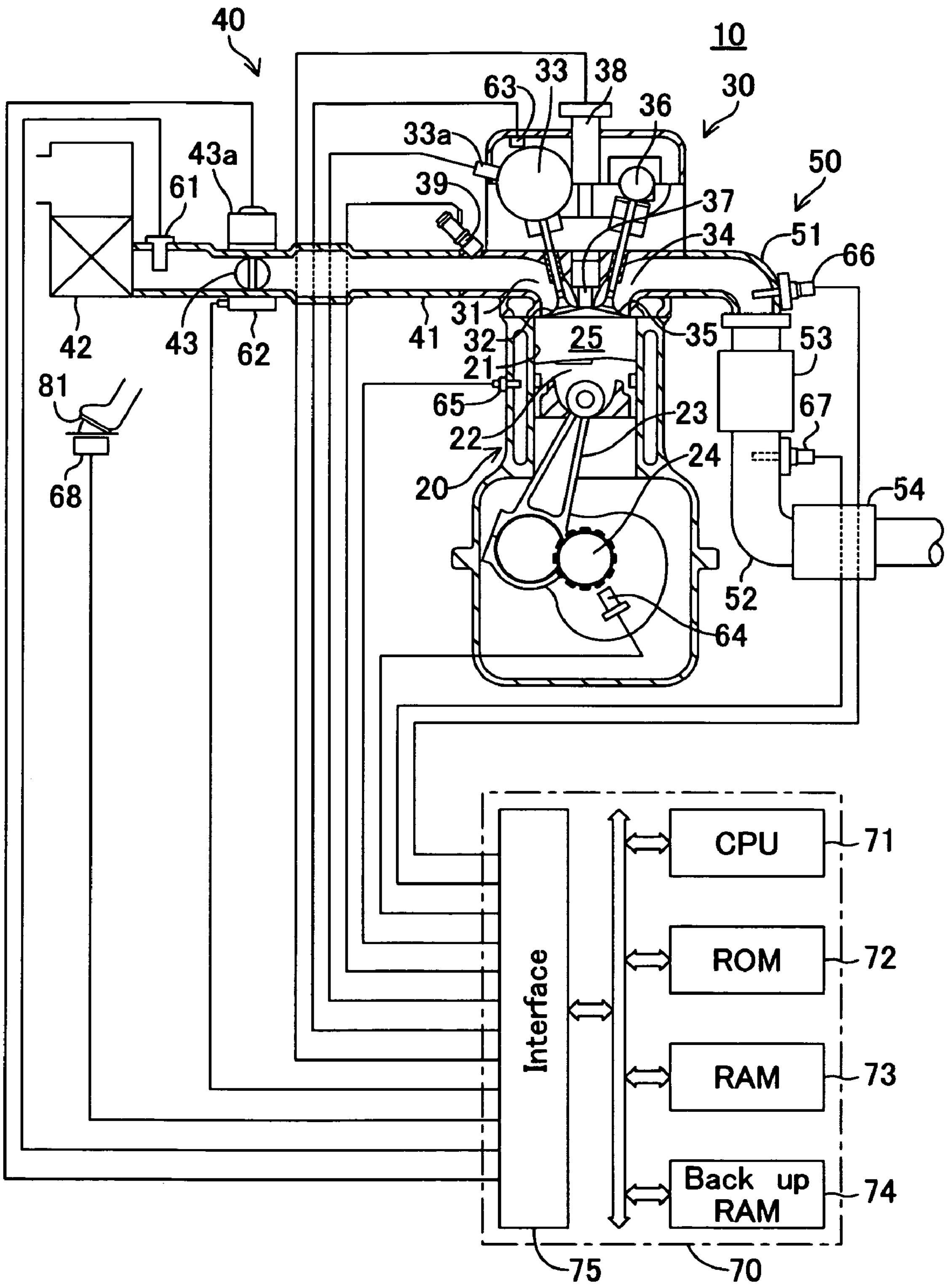
FIG. 1 is a schematic diagram of an internal combustion engine to which an air-fuel-ratio control apparatus according to an embodiment of the present invention is applied.

FIG. 1 shows a schematic configuration of a system configured such that an air-fuel-ratio control apparatus according to an embodiment of the present invention is applied to a spark-ignition multi-cylinder (e.g., 4-cylinder) internal combustion engine 10. The internal combustion engine 10 includes a cylinder block section 20 including a cylinder block, a cylinder block lower-case, an oil pan, etc.; a cylinder head section 30 fixed on the cylinder block section 20; an intake system 40 for supplying gasoline-air mixture to the cylinder block section 20; and an exhaust system 50 for discharging exhaust gas from the cylinder block section 20 to the exterior of the engine.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the corresponding connecting rod 23, whereby the crankshaft 24 rotates. The cylinder 21 and the head of the piston 22, together with the cylinder head section 30, form a combustion chamber 25.

The cylinder head section 30 includes an intake port 31 communicating with the combustion chamber 25; an intake valve 32 for opening and closing the intake port 31; a variable intake timing unit 33 including an intake cam shaft for driving the intake valve 32 and adapted to continuously change the phase angle of the intake cam shaft; an actuator 33*a* of the variable intake timing unit 33; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector (fuel injection means) 39 for injecting fuel into the intake port 31.

The intake system 40 includes an intake pipe 41 including an intake manifold, communicating with the intake port 31, and forming an intake passage together with the intake port 31; an air filter 42 provided at an end portion of the intake pipe 41; a throttle valve 43 provided within the intake pipe 41 and adapted to vary the cross-sectional opening area of the intake passage; and a throttle valve actuator 43*a*, which consists of a DC motor and serves as throttle valve drive means.

The exhaust system 50 includes an exhaust manifold 51 communicating with the corresponding exhaust port 34; an exhaust pipe 52 connected to the exhaust manifold 51 (in actuality, connected to a merge portion where a plurality of the exhaust manifolds 51 communicating with the corresponding exhaust ports 34 merge together); an upstream 3-way catalyst unit 53 (also called upstream catalytic converter or start catalytic converter; however, hereinafter referred to as the "first catalyst unit 53") disposed (interposed) in the exhaust pipe 52; and a downstream 3-way catalyst unit 54 (also called under-floor catalytic converter because it is disposed under the floor of the vehicle; however, hereinafter referred to as the "second catalyst unit 54") disposed (interposed) in the exhaust pipe 52 to be located downstream of the first catalyst unit 53. The exhaust port 34, the exhaust manifold 51, and the exhaust pipe 52 form an exhaust passage.

Meanwhile, this system includes a hot-wire air flowmeter 61; a throttle position sensor 62; a cam position sensor 63; a crank position sensor 64; a water temperature sensor 65; an air-fuel-ratio sensor 66 (hereinafter referred to as the "upstream air-fuel-ratio sensor 66") disposed in the exhaust passage to be located upstream of the first catalyst unit 53 (in the present embodiment, located at the merge portion where the exhaust manifolds 51 merge together); an air-fuel-ratio sensor 67 (hereinafter referred to as the "downstream air-fuel-ratio sensor 67") disposed in the exhaust passage to be located between the first catalyst unit 53 and the second catalyst unit 54; and an accelerator opening sensor 68.

The hot-wire air flowmeter 61 detects the mass flow rate per unit time of intake air flowing through the intake pipe 41, and outputs a signal indicative of the mass flow rate Ga. The throttle position sensor 62 detects the opening of the throttle valve 43 and outputs a signal indicative of the throttle-valve opening TA. The cam position sensor 63 generates a signal that assumes the form of a single pulse (G2 signal) every time the intake cam shaft rotates by 90° (i.e., every time the crankshaft 24 rotates by 180°). The crank position sensor 64 outputs a signal that assumes the form of a narrow pulse every 10° rotation of the crankshaft 24 and assumes the form of a wide pulse every 360° rotation of the crankshaft 24. This signal indicates the operation speed NE. The water temperature sensor 65 detects the temperature of cooling water for the internal combustion engine 10 and outputs a signal indicative of the cooling-water temperature THW.

Figure 2:
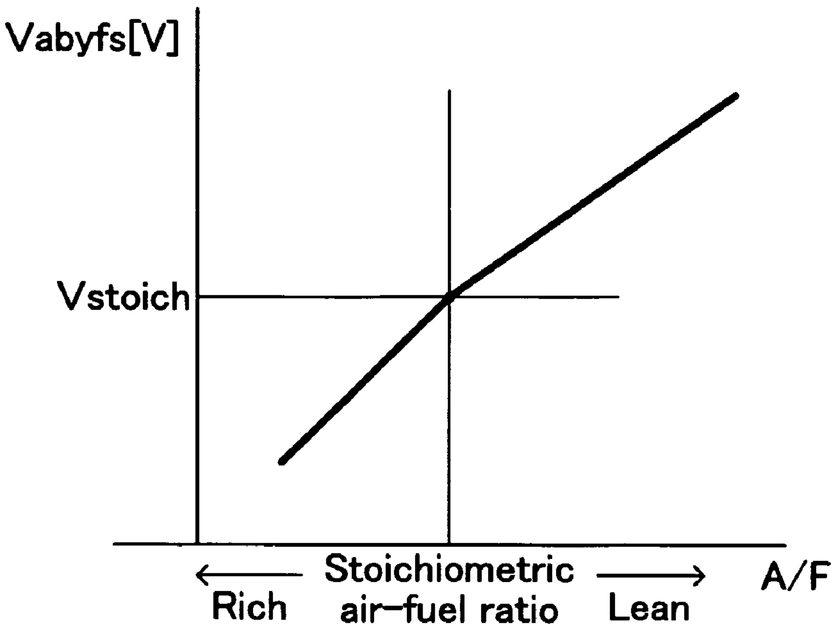
FIG. 2 is a graph showing the relationship between output voltage of an upstream air-fuel-ratio sensor shown in FIG. 1 and air-fuel ratio.

The upstream air-fuel-ratio sensor 66 is a limiting-current-type oxygen concentration sensor. As shown in FIG. 2, the upstream air-fuel-ratio sensor 66 outputs a current corresponding to the measured air-fuel ratio A/F, and outputs a voltage value Vabyfs, which is a voltage corresponding to the current. When the air-fuel ratio is equal to the stoichiometric air-fuel ratio, the voltage value Vabyfs becomes a value Vstoich. As is apparent from FIG. 2, the upstream air-fuel-ratio sensor 66 can accurately detect the air-fuel ratio A/F over a wide range.

Figure 3:
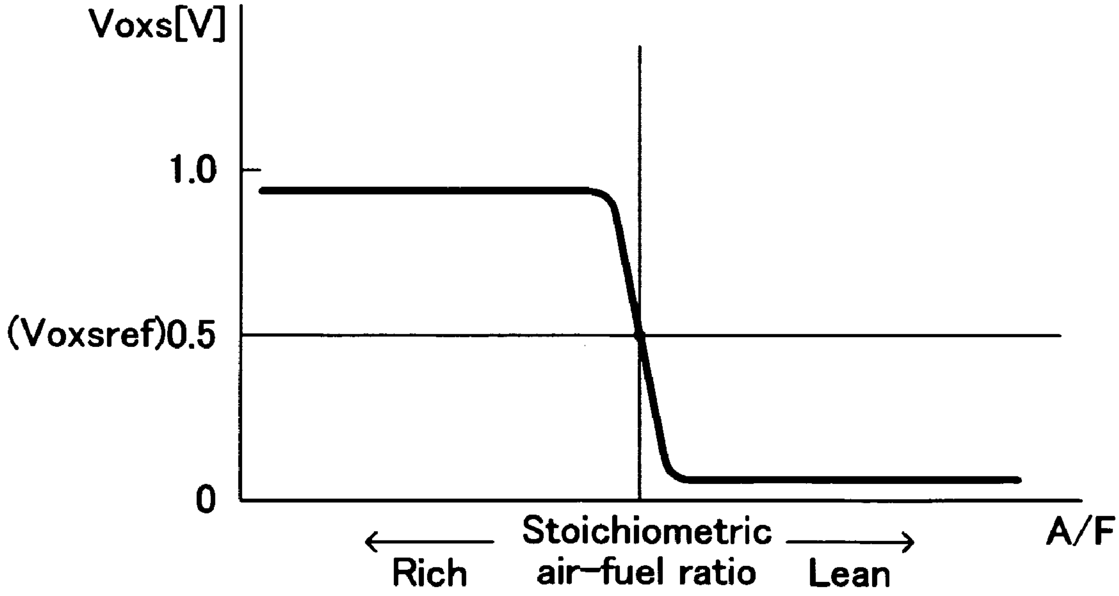
FIG. 3 is a graph showing the relationship between output voltage of a downstream air-fuel-ratio sensor shown in FIG. 1 and air-fuel ratio.

The downstream air-fuel-ratio sensor 67 is an electromotive-force-type (concentration-cell-type) oxygen concentration sensor. As shown in FIG. 3, the downstream air-fuel-ratio sensor 67 outputs an output value Voxs, which is a voltage that changes sharply in the vicinity of the stoichiometric air-fuel ratio. More specifically, the downstream air-fuel-ratio sensor 67 outputs about 0.1 V when the measured air-fuel ratio is on the lean side with respect to the stoichiometric air-fuel ratio, about 0.9 V when the measured air-fuel ratio is on the rich side with respect to the stoichiometric air-fuel ratio, and 0.5 V when the measured air-fuel ratio is equal to the stoichiometric air-fuel ratio. The accelerator opening sensor 68 detects an operation amount of an accelerator pedal 81 operated by a driver, and outputs a signal representing the operation amount Accp of the accelerator pedal 81.

An electric control device 70 is a microcomputer, and includes the following components, which are mutually connected via a bus: a CPU 71; ROM 72 in which routines (programs) to be executed by the CPU 71, tables (lookup tables, maps), constants, and the like are stored in advance; RAM 73 in which the CPU 71 stores data temporarily as needed; backup RAM 74, which stores data while power is on and retains the stored data even while power is held off; and an interface 75 including AD converters. The interface 75 is connected to the sensors 61 to 68. Signals from the sensors 61 to 68 are supplied to the CPU 71 through the interface 75. Drive signals from the CPU 71 are sent, through the interface 75, to the actuator 33*a* of the variable intake timing unit 33, the igniter 38, the injector 39, and the throttle valve actuator 43*a*.

Outline of Air-Fuel Ratio Feedback Control:

Next will be described the outline of feedback control of the air-fuel ratio of the engine, which is performed by the air-fuel-ratio control apparatus configured as described above.

The air-fuel-ratio control apparatus of the present embodiment feedback-controls the air-fuel ratio in accordance with the output value of Vabyfs of the upstream air-fuel-ratio sensor 66 (i.e., the air-fuel ratio as measured upstream of the first catalyst unit 53) (and the output value Voxs of the downstream air-fuel-ratio sensor 67 (i.e., the air-fuel ratio as measured downstream of the first catalyst unit 53) in this embodiment) in such a manner that the output value Vabyfs of the upstream air-fuel-ratio sensor 66 becomes equal to an output value of the upstream air-fuel-ratio sensor 66 corresponding to the upstream-side target air-fuel ratio abyfr(k).

Figure 4:
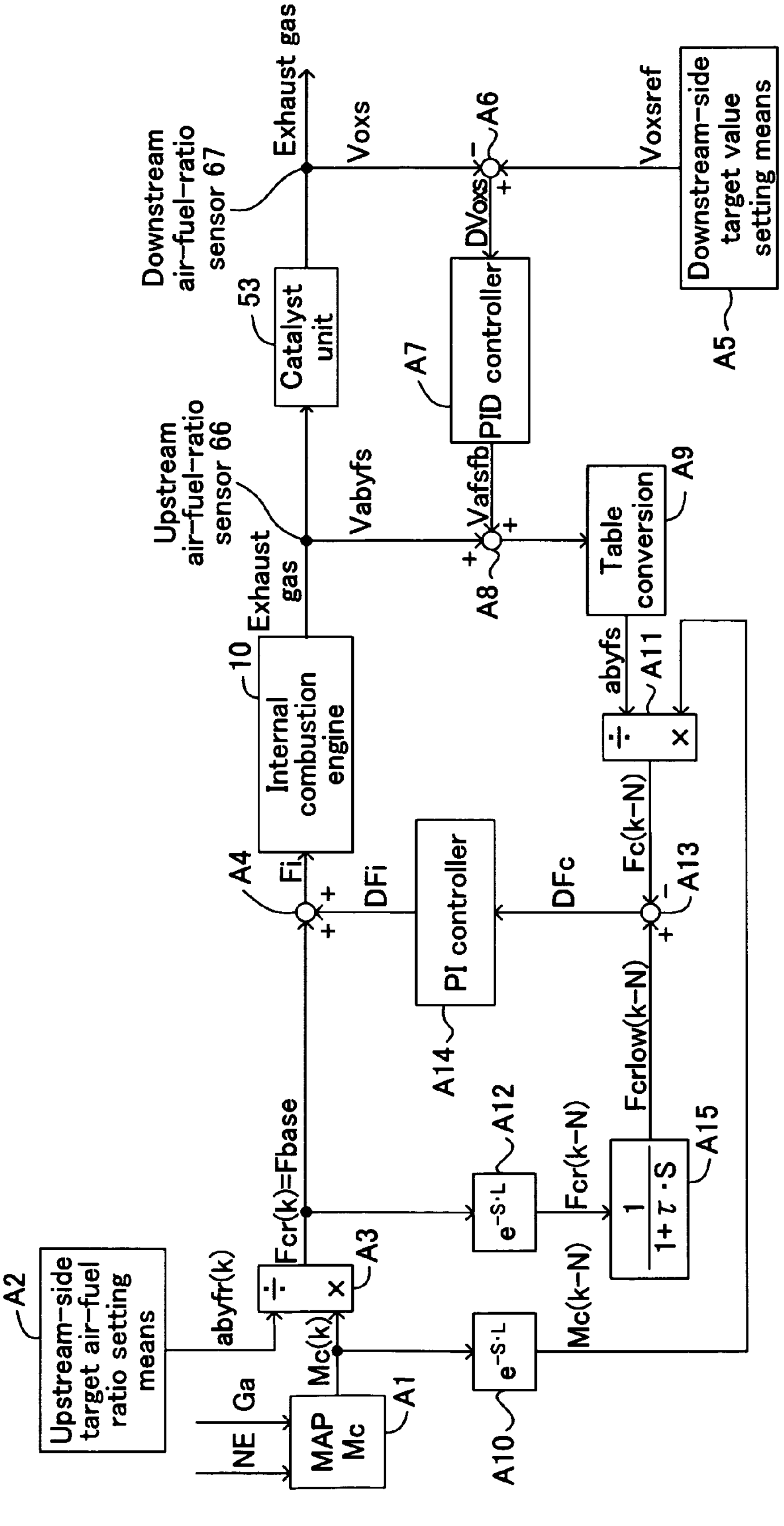
FIG. 4 is a functional block diagram when the air-fuel-ratio control apparatus shown in FIG. 1 executes an air-fuel-ratio feedback control.

More specifically, as shown by the functional block diagram of FIG. 4, the air-fuel-ratio control apparatus (hereinafter, may be referred to as the "present apparatus") includes various means A1 to A15. Each of the means A1 to A15 will be described with reference to FIG. 4.

<Calculation of Base Fuel Injection Quantity>

First, cylinder intake air quantity calculation means A1 calculates a cylinder intake air quantity Mc(k), which is the quantity of air taken in a cylinder which is starting an intake stroke this time, on the basis of the intake air flow rate Ga measured by the air flowmeter 61, the operation speed NE obtained on the basis of the output of the crank position sensor 64, and a table MapMc stored in the ROM 72. Notably, the subscript (k) represents that the cylinder intake air quantity is a value regarding the present intake stroke (the same also applies to other physical quantities). The cylinder intake air quantity Mc is stored in the RAM 73 whenever each cylinder starts the intake stroke, in such a manner that the cylinder intake air quantity is related to each intake stroke of each cylinder.

Upstream-side target air-fuel ratio setting means A2 determines an upstream-side target air-fuel ratio abyfr(k) on the basis of operating conditions of the internal combustion engine 10, such as operation speed NE and throttle-valve opening TA. Except for special cases such as an immediate aftermath of release of the discontinuation of the fuel supply to the combustion chamber 25 (so-called fuel cut), and the case (hereinafter referred to as "the case in which an active air-fuel control is performed") in which the air-fuel ratio alternatively varies to the rich side or to the lean side from the stoichiometric air-fuel ratio in order to acquire the maximum oxygen storage quantity of the first and second catalyst units 53 and 54 etc., the upstream-side target air-fuel ratio abyfr(k) is set to the stoichiometric air-fuel ratio after completion of warming up of the internal combustion engine 10. The active air-fuel ratio control is disclosed in, for example, Japanese Patent Application Laid-Open (kokai) No. 5-133264, so the detailed explanation thereof will be omitted here. The upstream-side target air-fuel ratio abyfr is stored in the RAM 73 whenever each cylinder starts the intake stroke, in such a manner that the cylinder intake air quantity is related to each intake stroke of each cylinder. This upstream-side target air-fuel ratio setting means A2 corresponds to target air-fuel ratio determining means.

Base fuel injection quantity calculation means A3 calculates a target cylinder fuel supply quantity Fcr(k) (i.e., base fuel injection quantity Fbase), which is a fuel injection quantity for the present intake stroke required to render the air-fuel ratio equal to the upstream-side target air-fuel ratio abyfr(k), by dividing the cylinder intake air quantity Mc(k), obtained by the cylinder intake air quantity calculation means A1, by the upstream-side target air-fuel ratio abyfr(k) set by the upstream-side target air-fuel ratio setting means A2. The target cylinder fuel supply quantity Fcr is stored in the RAM 73 whenever each cylinder starts the intake stroke, in such a manner that the cylinder intake air quantity is related to each intake stroke of each cylinder. The base fuel injection quantity calculation means A3 corresponds to base fuel injection quantity acquiring means.

In the above-described manner, the present apparatus obtains the target cylinder fuel supply quantity Fcr(k) (i.e., base fuel injection quantity Fbase) by utilizing the cylinder intake air quantity calculation means A1, upstream-side target air-fuel ratio setting means A2, and base fuel injection quantity calculation means A3.

<Calculation of Fuel Injection Quantity>

Fuel injection quantity calculation means A4 calculates a fuel injection quantity Fi in accordance with Equation (1) described below by adding an upstream-side feedback correction value DFi described later to the base fuel injection quantity Fbase obtained by the base fuel injection quantity calculation means A3. The fuel injection quantity calculation means A4 corresponds to fuel injection quantity calculation means.

$$Fi=F\text{base}+DFi \qquad \text{Eq. (1)}$$

In this manner, the present apparatus causes the injector 39 to inject fuel to a cylinder which starts the present intake stroke, in the fuel injection quantity Fi, which is obtained through correction of the base fuel injection quantity Fbase on the basis of the upstream-side feedback correction value DFi, the correction being performed by the fuel injection quantity calculation means A4. The means for giving an instruction of the fuel injection corresponds to air-fuel-ratio control means.

<Calculation of Downstream-Side Feedback Correction Value>

First, as in the case of the above-described upstream-side target air-fuel ratio setting means A2, downstream-side target value setting means A5 determines a downstream-side target value Voxsref on the basis of operating conditions of the internal combustion engine 10, such as operation speed NE and throttle-valve opening TA. In the present embodiment, the downstream-side target value Voxsref is set in such a manner that the air-fuel ratio corresponding to the downstream-side target value Voxsref is always equal to the above-described upstream-side target air-fuel ratio abyfr(k).

Output deviation calculation means A6 obtains an output deviation DVoxs in accordance with Equation (2) described below; i.e., by subtracting the output value Voxs of the downstream air-fuel-ratio sensor 67 at this moment from the downstream-side target value Voxsref presently set (specifically, set at the point when the instruction of injection of Fi this time is started) by the downstream-side target value setting means A5.

$$DVoxs=Voxsref-Voxs \qquad \text{Eq. (2)}$$

A PID controller A7 obtains a downstream-side feedback correction value Vafsfb in accordance with Equation (3) described below; i.e., by performing proportional plus integral plus derivative processing (PID processing) for the output deviation DVoxs.

$$Vafsfb=Kp\cdot DVoxs+Ki\cdot SDVoxs+Kd\cdot DDVoxs \qquad \text{Eq. (3)}$$

In Equation (3), Kp is a preset proportional gain (proportional constant), Ki is a preset integral gain (integral constant), and Kd is a preset derivative gain (derivative constant). Further, SDVoxs is a value obtained through integration of the output deviation DVoxs with respect to time, and DDVoxs is a value obtained through differentiation of the output deviation DVoxs with respect to time.

In the above-described manner, the present apparatus obtains the downstream-side feedback correction value Vafsfb, on the basis of the output value Voxs, in such a manner that the steady-state deviation of the output value Voxs of the downstream air-fuel-ratio sensor 67 from the downstream-side target value Voxsref becomes zero. This downstream-side feedback correction value Vafsfb is used for acquiring a control-use air-fuel ratio abyfs as described later.

<Calculation of Upstream-Side Feedback Correction Value>

Output value corresponding to control-use air-fuel ratio calculation means A8 obtains the output value corresponding to control-use air-fuel ratio (Vabyfs+Vafsfb) by adding the downstream-side feedback correction value Vafsfb obtained by the PID controller A7 to the output value Vabyfs from the upstream air-fuel-ratio sensor 66.

Table conversion means A9 obtains the control-use air-fuel ratio abyfs at the present time on the basis of the output value corresponding to control-use air-fuel ratio (Vabyfs+Vafsfb) calculated by the output value corresponding to control-use air-fuel ratio calculation means A8 and with reference to the table Mapabyfs shown in the previously-described FIG. 2, which defines the relationship between air-fuel ratio A/F and output value Vabyfs of the upstream air-fuel-ratio sensor 66. Thus, the control-use air-fuel ratio abyfs is an air-fuel ratio (apparent air-fuel ratio) that is different from the air-fuel ratio (detected air-fuel ratio) corresponding to the output value Vabyfs from the upstream air-fuel-ratio sensor 66 by the amount corresponding to the downstream-side feedback correction value Vafsfb.

As described above, the RAM 73 stores cylinder intake air quantities Mc which the cylinder intake air quantity calculation means A1 has obtained for each of intake strokes. Cylinder intake air quantity delay means A10 reads from the RAM 73 a cylinder intake air quantity Mc of the cylinder which has started an intake stroke at N strokes before the present point in time, and stores the same as a cylinder intake air quantity Mc(k−N). Supposing that the period from the instruction for injecting fuel to the time that the exhaust gas according to the combustion of the fuel in the combustion chamber 25 reaches the upstream air-fuel-ratio sensor 66 is referred to as a dead time L, the stroke N corresponds to the dead time L. Since the internal combustion engine 10 in this embodiment is a 4-cylinder internal combustion engine, the stroke is equal to the number of times of the instruction for fuel injection. Therefore, in this embodiment, the stroke N is equal to the number of times of the instruction for fuel injection corresponding to the dead time L.

Figure 5:
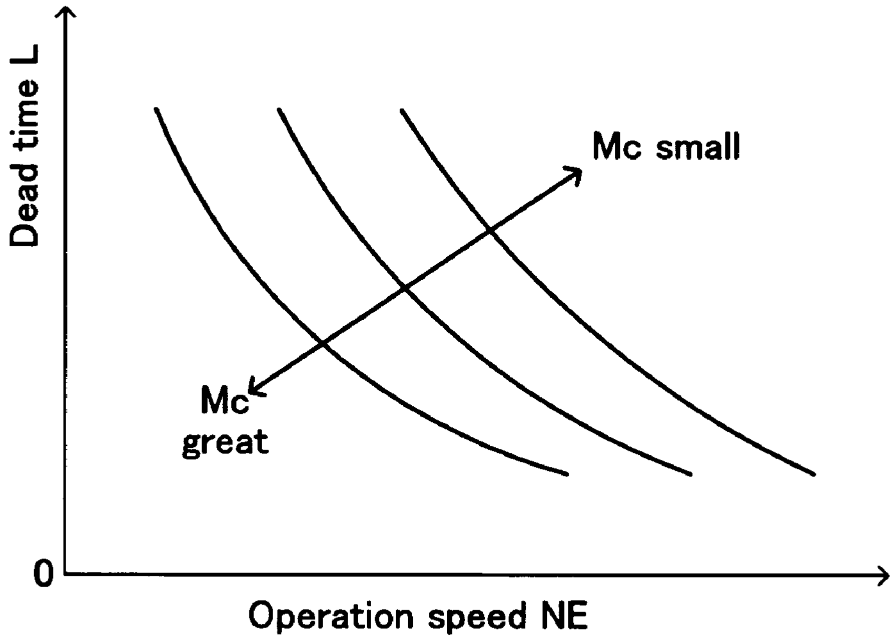
FIG. 5 is a graph showing a relationship among a dead time, operation speed, and cylinder intake air quantity.

The dead time L is represented as the sum of the time taken for the delay involved in the combustion stroke (stroke delay) and the time taken for the delay involved in the transportation of the exhaust gas in the exhaust passage (transportation delay). The time taken for the stroke delay is shortened with the increase in the operation speed NE, and the time taken for the transportation delay is shortened with the increase in the operation speed NE and the increase in the cylinder intake air quantity Mc(k). Specifically, the dead time L is shortened with the increase in the operation speed NE and the increase in the cylinder intake air quantity Mc(k) as shown in FIG. 5.

Figure 6:
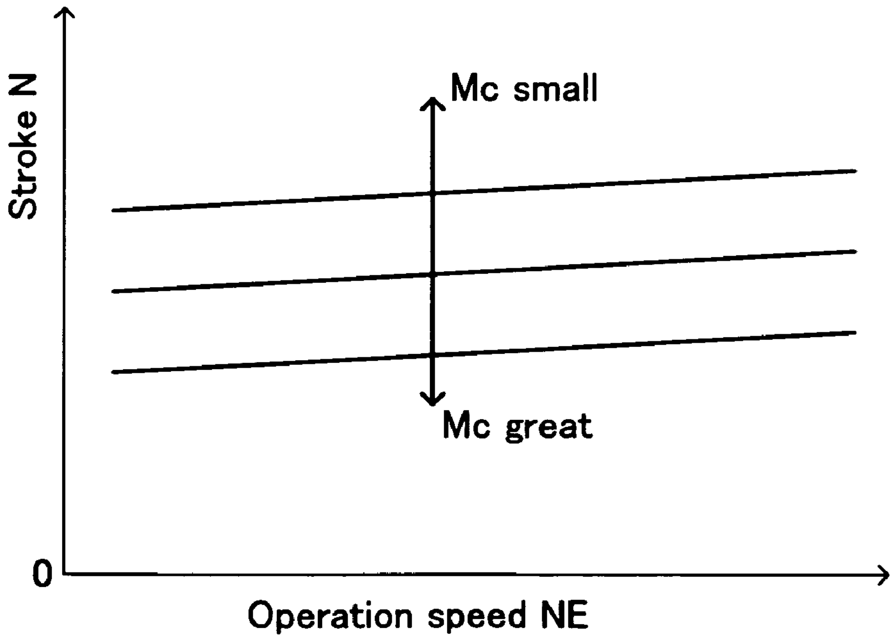
FIG. 6 is a graph showing a relationship among a stroke corresponding to the dead time, operation speed, and cylinder intake air quantity.

On the other hand, the stroke N decreases with the increase in the cylinder intake air quantity Mc(k) but is hardly affected by the operation speed NE as shown in FIG. 6. This is based upon the fact that the stroke per unit time is in proportion to the operation speed NE.

Figure 7:
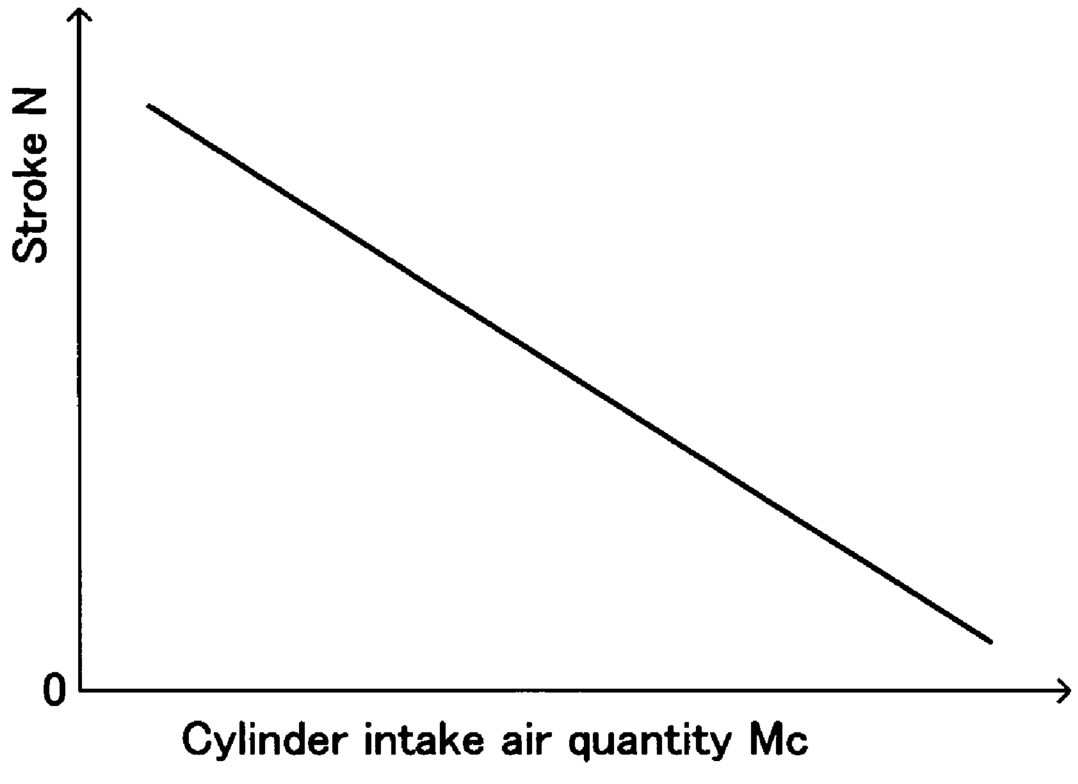
FIG. 7 is a graph referred to by the CPU shown in FIG. 1 and showing a table that defines the relationship between the stroke and cylinder intake air quantity.

Therefore, the stroke N can be obtained based upon the cylinder intake air quantity Mc(k), and a table MapN shown in the graph of FIG. 7, which defines the relationship between the cylinder intake air quantity Mc(k) and the stroke N. By virtue of this, the stroke N is determined to be a smaller value as the cylinder intake air quantity Mc(k) increases. The table having a single argument is used as described above, whereby the labor required for creating the table can be reduced, and the load of the CPU 71 required for searching the table can be reduced.

Control-use cylinder fuel supply quantity calculation means A11 obtains a control-use cylinder fuel supply quantity Fc(k−N) at the time point N strokes before the present point in time, through operation of dividing the cylinder intake air quantity Mc(k−N) at the time point N strokes before the present point in time obtained by the cylinder intake air quantity delay means A10, by the control-use air-fuel ratio abyfs this time obtained by the table conversion means A9.

The reason why the cylinder intake air quantity Mc(k−N) at the time point N strokes before the present point in time is divided by the control-use air-fuel ratio abyfs at the present point in time in order to obtain the control-use cylinder fuel supply quantity Fc(k−N) at the time point N stroke before the present point in time is that the output value Vabyfs from the upstream air-fuel-ratio sensor 66 at the present time represents the air-fuel ratio of the exhaust gas based upon the combustion of the gas mixture taken during the intake stroke at N strokes before the present point in time that corresponds to the dead time L.

As described above, the RAM 73 stores target cylinder fuel supply quantities Fcr which the base fuel injection quantity calculation means A3 has obtained for each of intake strokes. Target cylinder fuel supply quantity delay means A12 reads from the RAM 73 a target cylinder fuel supply quantity Fcr(k−N) at the time point N strokes before the present point in time, among the target cylinder fuel supply quantities Fcr. This value is inputted to a later-described low-pass filter A15 (second delay processing means), and the low-pass filter A15 outputs a low-pass filter passed target cylinder fuel supply quantity Fcrlow(k−N). The target cylinder fuel supply quantity delay means A12 corresponds to first delay processing means. Accordingly, the target cylinder fuel supply quantity Fcr(k−N) at the time point N strokes before the present point in time corresponds to a "value acquired by the first delay processing means".

Cylinder fuel supply quantity deviation calculation means A13 obtains a cylinder fuel supply quantity deviation DFc in accordance with Equation (4) described below; i.e., by subtracting the control-use cylinder fuel supply quantity Fc(k−N) at the time point N strokes before the present point in time obtained by the control-use cylinder fuel supply quantity calculation means A11 from the low-pass filter passed target cylinder fuel supply quantity Fcrlow(k−N) at the time point N strokes before the present point in time. The cylinder fuel supply quantity deviation DFc is a quantity that represents the excessiveness/insufficiency of fuel having been supplied to the cylinder at the time point N strokes before the present point in time.

$$DFc=Fcr\mathrm{low}(k-N)-Fc(k-N) \quad \text{Eq. (4)}$$

A PI controller A14 obtains an upstream-side feedback correction value DFi for compensating the excessiveness/insufficiency of fuel supply quantity at the time point N strokes before the present point in time in accordance with Equation (5) described below, i.e., by performing proportional plus integral processing (PI processing) for the cylinder fuel supply quantity deviation DFc, which is calculated by the cylinder fuel supply quantity deviation calculation means A13.

$$DFi=(Gp\cdot DFc+Gi\cdot SDFc)\cdot KFB \quad \text{Eq. (5)}$$

In Equation (5), Gp is a preset proportional gain (proportional constant), and Gi is a preset integral gain (integral constant). SDFc is a value obtained through integration of the cylinder fuel supply quantity deviation DFc with respect to time. The coefficient KFB is preferably changed depending on the operation speed NE, cylinder intake air quantity Mc, and other factors; however, in the present embodiment, the coefficient KFB is set to "1." The upstream-side feedback correction value DFi is used for obtaining the fuel injection quantity Fi by the fuel injection quantity calculation means A4 as previously described.

As described above, the present apparatus feedback-controls the air-fuel ratio on the basis of the output value Vabyfs from the upstream air-fuel-ratio sensor 66 in such a manner that the low-pass filter passed target cylinder fuel supply quantity Fcrlow(k−N) coincides with the control-use cylinder fuel supply quantity Fc(k−N) at the time point N strokes before the present point in time. In other words, the air-fuel ratio is fed back such that the control-use air-fuel ratio abyfs at the present time coincides with the upstream-side target air-fuel ratio abyfr(k−N) at the time point N strokes before the present point in time.

Since the control-use air-fuel ratio abyfs is different from the detected air-fuel ratio by the upstream air-fuel-ratio sensor 66 by the amount corresponding to the downstream-side feedback correction value Vafsfb as described above, the control-use air-fuel ratio abyfs is also changed in accordance with the output deviation DVoxs of the output value Voxs from the downstream air-fuel-ratio sensor 67 from the downstream-side target value Voxsref. As a result, the present apparatus performs a feedback control of the air-fuel ratio in such a manner that the output value Voxs from the downstream air-fuel-ratio sensor 67 also coincides with the downstream-side target value Voxsref.

The output value corresponding to control-use air-fuel ratio calculation means A8, table conversion means A9, cylinder intake air quantity delay means A10, control-use cylinder fuel supply quantity calculation means A11, cylinder fuel supply quantity deviation calculation means A13, and PI controller A14 correspond to upstream-side feedback correction value calculation means. The above is an outline of the feedback control of air-fuel ratio of the engine performed by the air-fuel-ratio control apparatus configured in the above-described manner.

<Ensuring Prompt Convergency of Air-Fuel Ratio to Target Air-Fuel Ratio with Respect to Sharp Change of Target Air-Fuel Ratio>

Subsequently, the low-pass filter A15 will be described. The present apparatus has the low-pass filter A15, whereby even if the upstream-side target air-fuel ratio abyfr(k) sharply changes, the present apparatus can promptly converge the air-fuel ratio to the target air-fuel ratio.

Figure 8:
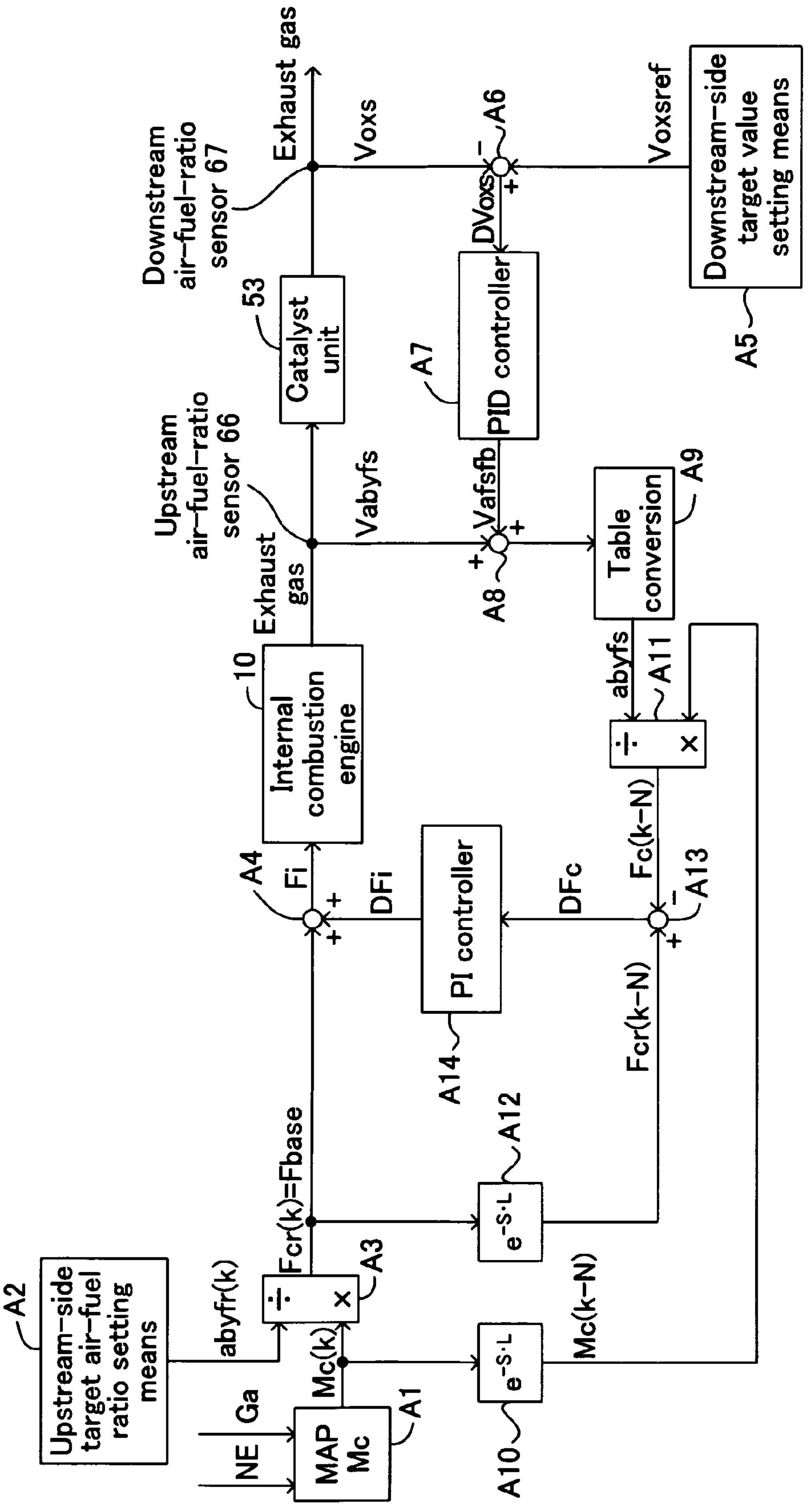
FIG. 8 is a functional block diagram when a conventional apparatus executes an air-fuel-ratio feedback control.

In order to explain the operation and effect, an apparatus (hereinafter referred to as "conventional apparatus") shown in the functional block diagram of FIG. 8 is firstly considered. The conventional apparatus is different from the present apparatus in that the conventional apparatus does not include the low-pass filter A15. Specifically, in the conventional apparatus, the cylinder fuel supply quantity deviation DFc is obtained by subtracting the control-use cylinder fuel supply quantity Fc(k−N) at the time point N strokes before the present point in time obtained by the control-use cylinder fuel supply quantity calculation means A11 from the target cylinder fuel supply quantity Fcr(k−N) at the time point N strokes before the present point in time obtained by the target cylinder fuel supply quantity delay means A12.

Figure 9:
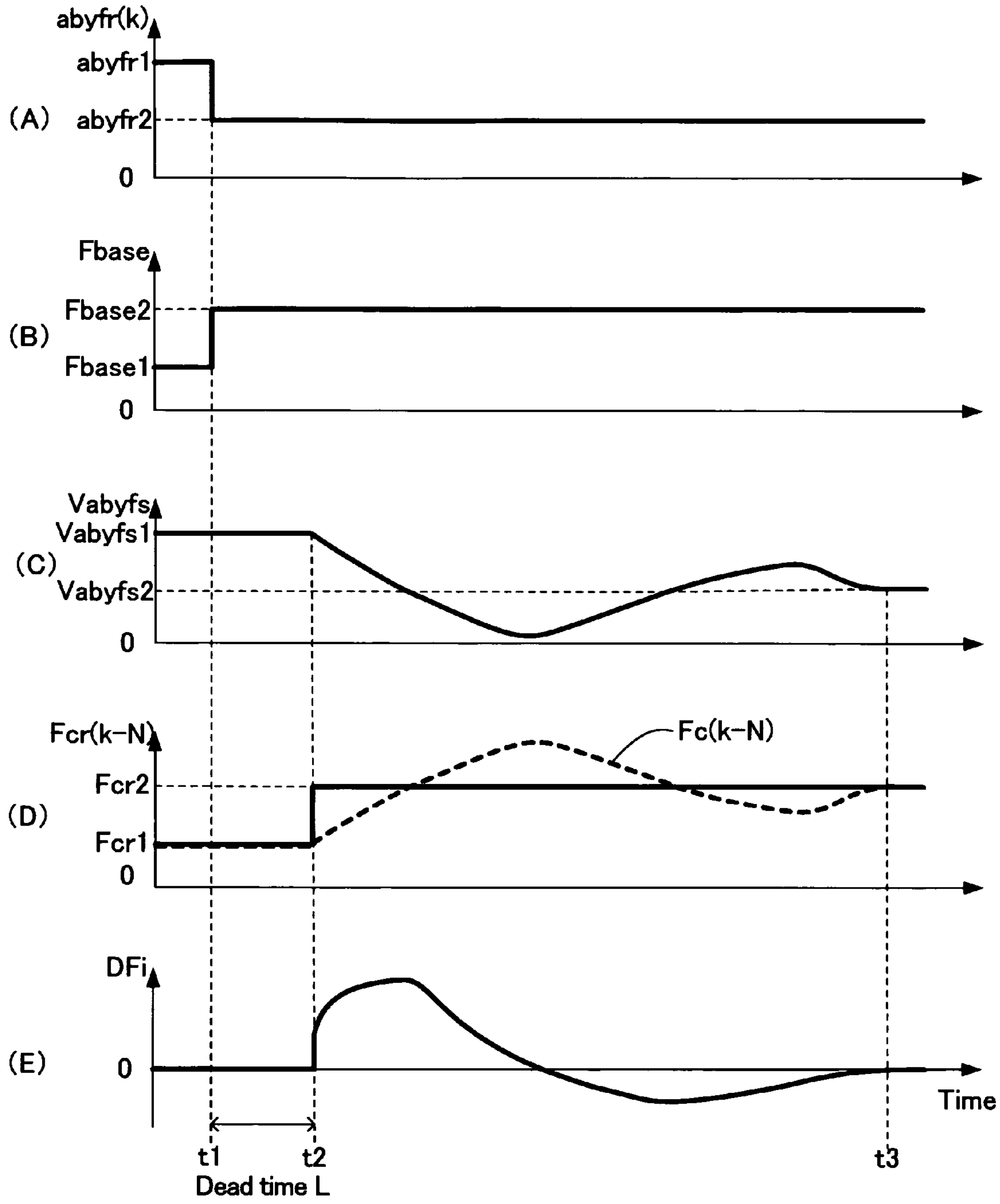
FIG. 9 is a time chart showing one example of a change in various variations etc. when a conventional apparatus executes the air-fuel-ratio feedback control.

FIG. 9 is a time chart showing one example of a change in various variables or the like when the conventional apparatus is applied to the internal combustion engine 10. This example describes the change in various variations or the like when the upstream-side target air-fuel ratio abyfr(k) is supposed to change only once in a stepwise manner by the active air-fuel ratio control in case where the cylinder intake air quantity Mc(k) is constant. For simplifying the explanation, the downstream-side feedback correction value Vafsfb is supposed to be maintained to be "0". Specifically, it is supposed that the detected air-fuel ratio and the control-use air-fuel ratio abyfs coincide with each other.

In this example, before the time t1 that the upstream-side target air-fuel ratio abyfr(k) changes, the upstream-side target air-fuel ratio abyfr(k) becomes abyfr1 (e.g., stoichiometric air-fuel ratio) as shown in (A), the base fuel injection quantity Fbase becomes a value Fbase1 that corresponds to the value abyfr1 as shown in (B), the output value Vabyfs from the upstream air-fuel-ratio sensor 66 becomes a value Vabyfs1 that corresponds to the value abyfr1 as shown in (C), the target cylinder fuel supply quantity Fcr(k−N) and the control-use cylinder fuel supply quantity Fc(k−N) at the time point N strokes before the present point in time become a value Fcr1 (=Fbase1) as shown in (D), and the upstream-side feedback correction value DFi is maintained to be "0" as shown in (E). Specifically, the air-fuel ratio of the exhaust gas is maintained to be the value abyfr1 before the time t1.

When the upstream-side target air-fuel ratio abyfr(k) decreases to a value abyfr2 (accordingly, deviates on the richer side than the value abyfr1), which is smaller than the value abyfr1, in a stepwise manner at the time t1 as shown in (A), the base fuel injection quantity Fbase simultaneously increases from the value Fbase1 to a value Fbase2 (>Fbase1), which corresponds to the value abyfr2, in a stepwise manner as shown in (B). In addition, the target cylinder fuel supply quantity Fcr(k) also increases from the value Fcr1 to the value Fcr2 (=Fbase2) in a stepwise manner at the time t1, whereby, as shown by a solid line in (D), the target cylinder fuel supply quantity Fcr(k−N) is maintained to be the value Fcr1 before a time t2 that is the point after the dead time L has elapsed from the time t1, and increases from the value Fcr1 to the value Fcr2 in a stepwise manner at the time t2.

The air-fuel ratio of the exhaust gas that is newly generated also changes at the time t1 from the value abyfr1 to the rich side in a stepwise manner due to the stepwise increase of the base fuel injection quantity Fbase at the time t1. The stepwise change of the air-fuel ratio of the exhaust gas to the rich side does not appear as the change of the output value Vabyfs from the upstream air-fuel-ratio sensor 66 before the time t2. Therefore, as shown in (C), the output value Vabyfs from the upstream air-fuel-ratio sensor 66 is maintained to be the value Vabyfs1 until the time t2.

With this, the control-use cylinder fuel supply quantity Fc(k−N) determined on the basis of the output value Vabyfs from the upstream air-fuel-ratio sensor 66 is also maintained to be the value Fcr1 until the time t2 as shown by a broken line in (D), like the target cylinder fuel supply quantity Fcr(k−N). As a result, since the cylinder fuel supply quantity deviation DFc is maintained to be "0" until the time t2, the upstream-side feedback correction value DFi is also maintained to be "0" until the time t2 as shown in (E). From the above, the air-fuel ratio of the exhaust gas that is newly generated is maintained to be the value equal to the value abyfr2 (see Equation (1)) during the period from the time t1 to the time t2.

The exhaust gas having the air-fuel ratio of abyfr2 reaches the upstream air-fuel-ratio sensor 66 at the time t2. The upstream air-fuel-ratio sensor 66 has a response delay. Therefore, the output value Vabyfs from the upstream air-fuel-ratio sensor 66 decreases relatively gently from the value Vabyfs1 after the time t2 with the response delay as shown in (C). Accordingly, the control-use cylinder fuel supply quantity Fc(k−N) also increases relatively gently from the value Fcr1 after the time t2 as shown by the broken line in (D).

On the other hand, the target cylinder fuel supply quantity Fcr(k−N) increases in a stepwise manner from the value Fcr1 to the value Fcr2 at the time t2 as shown by the solid line in (D) as described above. Therefore, the cylinder fuel supply quantity deviation DFc becomes a great positive value immediately after the time t2, and hence, the upstream-side feedback correction value DFi also sharply increases from “0” immediately after the time t2 as shown in (E). Accordingly, the air-fuel ratio of the exhaust gas that is newly generated becomes the air-fuel ratio that is deviated greatly to the rich side by the amount corresponding to the upstream-side feedback correction value DFi with respect to the value abyfr2 after the time t2.

As a result, as shown in (C) and by the broken line in (D), the output value Vabyfs from the upstream air-fuel-ratio sensor 66 and the control-use cylinder fuel supply quantity Fc(k−N) greatly fluctuate respectively about the value Vabyfs2 corresponding to the value abyfr2 and the value Fcr2 after the time t2, and then, converge to the value Vabyfs2 and the value Fcr2 respectively at the time t3 that is the point after a relatively long time has elapsed from the time t2.

On the other hand, because of the action of the time-integrated value SDFc of the cylinder fuel supply quantity deviation DFc, the upstream-side feedback correction value DFi has a characteristic of keeping on increasing during the time in which the cylinder fuel supply quantity deviation DFc is maintained to be a positive value, and keeping on decreasing during the time in which the cylinder fuel supply quantity deviation DFc is maintained to be a negative value (see Equation (5)). Therefore, the upstream-side feedback correction value DFi greatly increases from “0” immediately after the time t2, greatly fluctuates about “0”, and then, converges to “0” at the time t3, as shown in (E).

This means that relatively great fluctuation is produced on the air-fuel ratio over a relatively long period, i.e., from the time t2 to the time t3, and then, the air-fuel ratio converges to the upstream-side target air-fuel ratio abyfr(k) at the time t3.

<Operation and Effect of Low-Pass Filter A15>

As described above, when the upstream-side target air-fuel ratio abyfr(k) changes in a stepwise manner, the air-fuel ratio cannot promptly be converged to the upstream-side target air-fuel ratio abyfr(k) in the conventional apparatus. This is caused by the relatively great change in the upstream-side feedback correction value DFi after the time t2. Therefore, in order to promptly converge the air-fuel ratio to the upstream-side target air-fuel ratio abyfr(k), it is preferable that the change of the upstream-side feedback correction value DFi after the time t2 is more reduced.

The relatively great change of the upstream-side feedback correction value DFi after the time t2 is based upon the control-use cylinder fuel supply quantity Fc(k−N) starting to increase with the response delay of the upstream air-fuel-ratio sensor 66, with respect to the stepwise increase of the target cylinder fuel supply quantity Fcr(k−N).

Specifically, in order to reduce the change in the upstream-side feedback correction value DFi after the time t2, the value described below may be used, instead of the target cylinder fuel supply quantity Fcr(k−N) itself, as the value from which the control-use cylinder fuel supply quantity Fc(k−N) is subtracted upon the calculation of the cylinder fuel supply quantity deviation DFc. Specifically, the used value (hereinafter referred to as “low-pass filter passed target cylinder fuel supply quantity Fcrlow(k−N)”) is a value obtained by performing a low-pass filter process having a time constant τ, which is equal to the time constant corresponding to the response delay of the upstream air-fuel-ratio sensor 66, to the target cylinder fuel supply quantity Fcr(k−N). Therefore, an apparatus (i.e., the present apparatus) formed by adding the low-pass filter A15 to the conventional apparatus is then considered.

The low-pass filter A15 is a first-order digital filter as expressed by the following Equation (6), which represents the characteristics of the filter by use of a Laplace operators. In Equation (6), τ is a time constant (a parameter relating to responsiveness). The low-pass filter A15 substantially prohibits passage of high-frequency components whose frequencies are higher than the frequency (1/τ).

$$1/(1+\tau\cdot s) \qquad \text{Eq. (6)}$$

Figure 10:
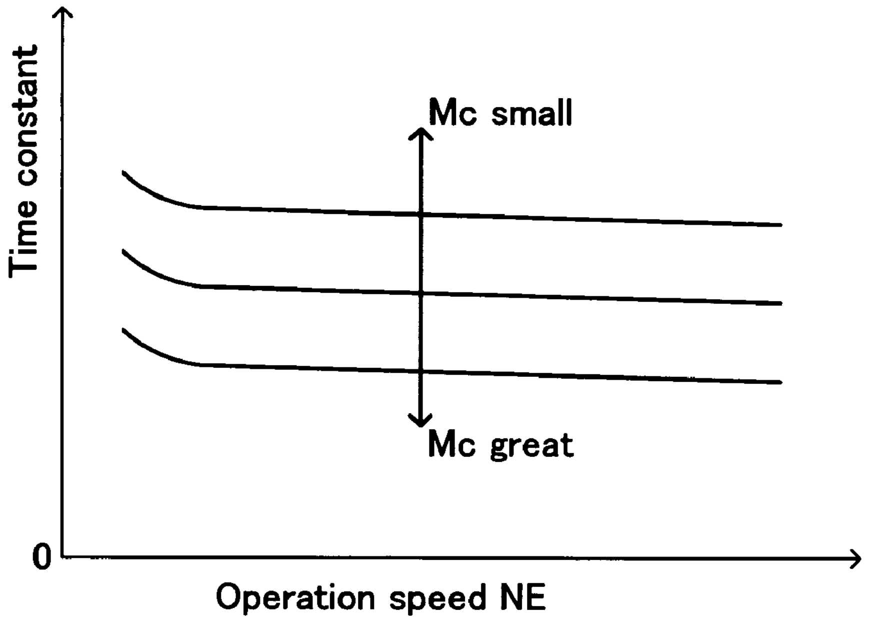
FIG. 10 is a graph showing a relationship among a time constant corresponding to a response delay of the upstream air-fuel-ratio sensor shown in FIG. 1, operation speed, and cylinder intake air quantity.

The degree of the response delay of the upstream air-fuel-ratio sensor 66 is greatly affected by the cylinder intake air quantity Mc(k) and also affected by the operation speed NE. However, although the time constant corresponding to the response delay of the upstream air-fuel-ratio sensor 66 decreases with the increase in the cylinder intake air quantity Mc(k), it is hardly affected by the operation speed NE in actuality as shown in FIG. 10.

Figure 11:
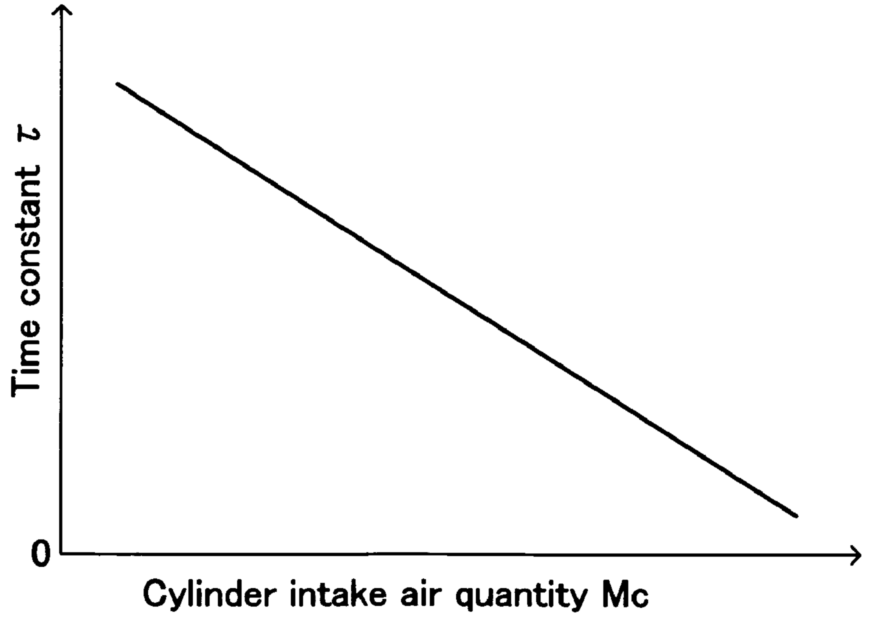
FIG. 11 is a graph referred to by the CPU shown in FIG. 1 and showing a table that defines the relationship between a time constant of a low-pass filter and cylinder intake air quantity.

In the present apparatus, the time constant τ can be obtained from the cylinder intake air quantity Mc(k) and with reference to a table Mapτ shown in FIG. 11, which defines the relationship between the time constant τ and the cylinder intake air quantity Mc. Thus, the time constant τ is determined to be a smaller value as the cylinder intake air quantity Mc(k) increases. The use of the table having a single argument as described above reduces the labor required for creating the table, and the load of the CPU 71 required for searching the table.

The low-pass filter A15 receives the target cylinder fuel supply quantity Fcr(k−N) obtained by the target cylinder fuel supply quantity delay means A12, and outputs the low-pass filter passed target cylinder fuel supply quantity Fcrlow(k−N) to the cylinder fuel supply quantity deviation calculation means A13. This low-pass filter A15 corresponds to second delay processing means. Therefore, the low-pass filter passed target cylinder fuel supply quantity Fcrlow(k−N) corresponds to a “value acquired by the second delay processing means”.

In the present apparatus, the control-use cylinder fuel supply quantity Fc(k−N) is subtracted from the low-pass filter passed target cylinder fuel supply quantity Fcrlow(k−N) by the cylinder fuel supply quantity deviation calculation means A13 as described above, whereby the cylinder fuel supply quantity deviation DFc is calculated.

Figure 12:
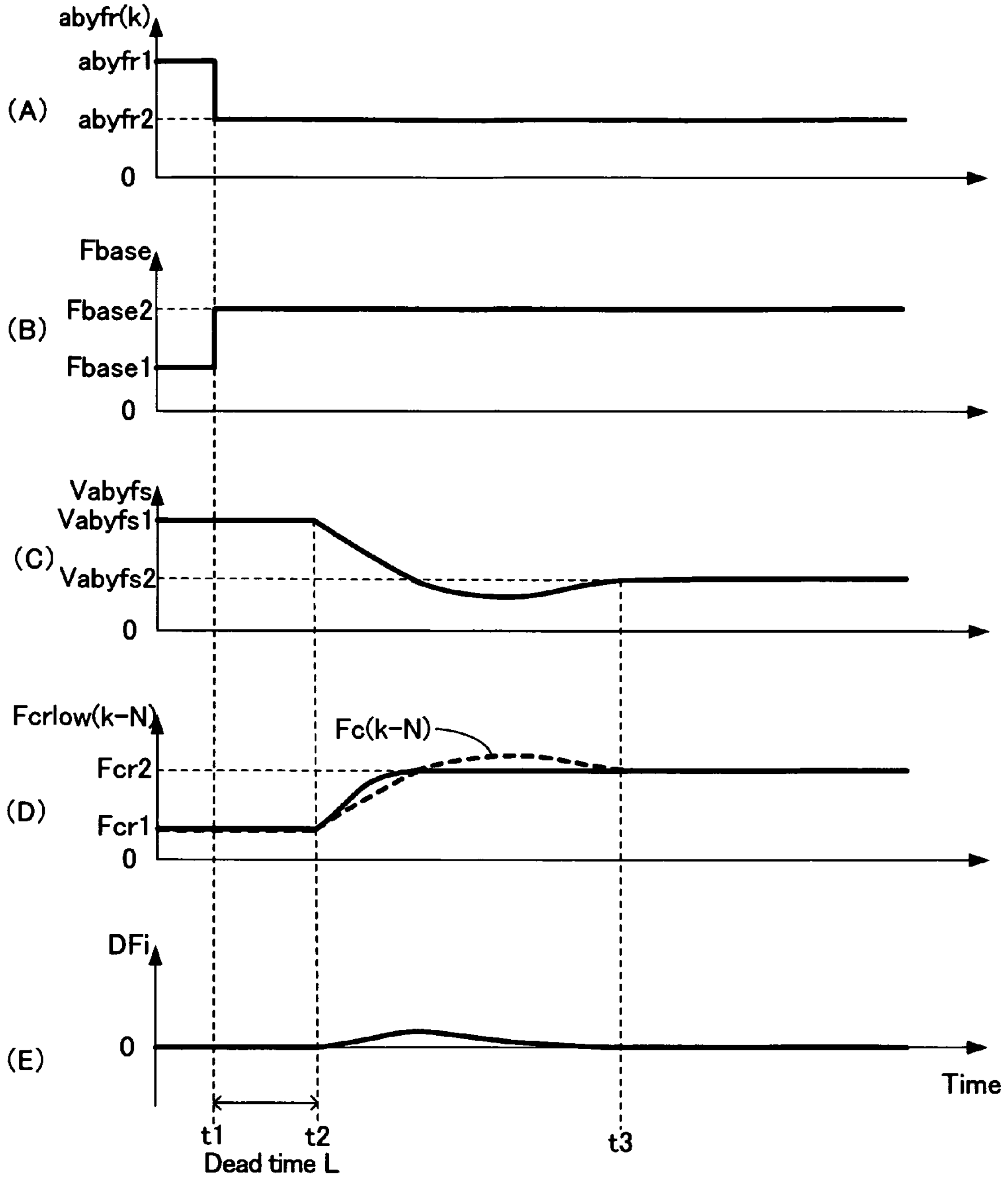
FIG. 12 is a time chart showing one example of a change in various variations etc. when the air-fuel-ratio control apparatus shown in FIG. 1 executes the air-fuel-ratio feedback control.

FIG. 12 is a time chart, corresponding to FIG. 9, showing one example of a change in various variations and the like when the present apparatus is applied to the internal combustion engine 10. The times t1, t2, and t3 in FIG. 12 respectively correspond to the times t1, t2 and t3 in FIG. 9. Like the case shown in FIG. 9, when the upstream-side target air-fuel ratio abyfr(k) changes from the value abyfr1 to the value abyfr2 in a stepwise manner at the time t1 as shown in (A), the low-pass filter passed target cylinder fuel supply quantity Fcrlow(k−N) changes from the value Fcr1 toward the value Fcr2 after the time t2 with the response delay corresponding to the time constant τ as shown by a solid line in (D).

Accordingly, the degree of the delay of the change in the low-pass filter passed target cylinder fuel supply quantity Fcrlow(k−N) is made close to the degree of the response delay of the change in the output value Vabyfs from the upstream air-fuel-ratio sensor 66. Therefore, the upstream-side feedback correction value DFi only slightly increases from "0" after the time t2 as shown in (E). This increasing amount corresponds to the error between the time constant τ of the low-pass filter process and the time constant corresponding to the response delay of the upstream air-fuel-ratio sensor 66.

As a result, the change in the upstream-side feedback correction value DFi during the period from the time t2 to the time t3 becomes much smaller than that in the conventional apparatus, and the period from the time t2 to the time t3 becomes much shorter than that in the conventional apparatus as shown in (E). In other words, the period necessary for the air-fuel ratio to converge to the upstream-side target air-fuel ratio abyfr(k) becomes much shorter. Specifically, thanks to the operation of the low-pass filter A15, the present apparatus can prevent the occurrence of the relatively great fluctuation of the air-fuel ratio, which is caused by the increase in the upstream-side feedback correction value DFi, even if the upstream-side target air-fuel ratio abyfr(k) changes in a stepwise manner. Consequently, the air-fuel ratio can promptly be converged to the target air-fuel ratio.

Actual Operation:

Next, the actual operation of the air-fuel-ratio control apparatus will be described. For the convenience of explanation, "MapX(a1, a2, . . . )" represents a table for obtaining X having arguments a1, a2, . . . . When the argument is the detected value of the sensors, the current value is used.

<Air-Fuel-Ratio Feedback Control>

Figure 13:
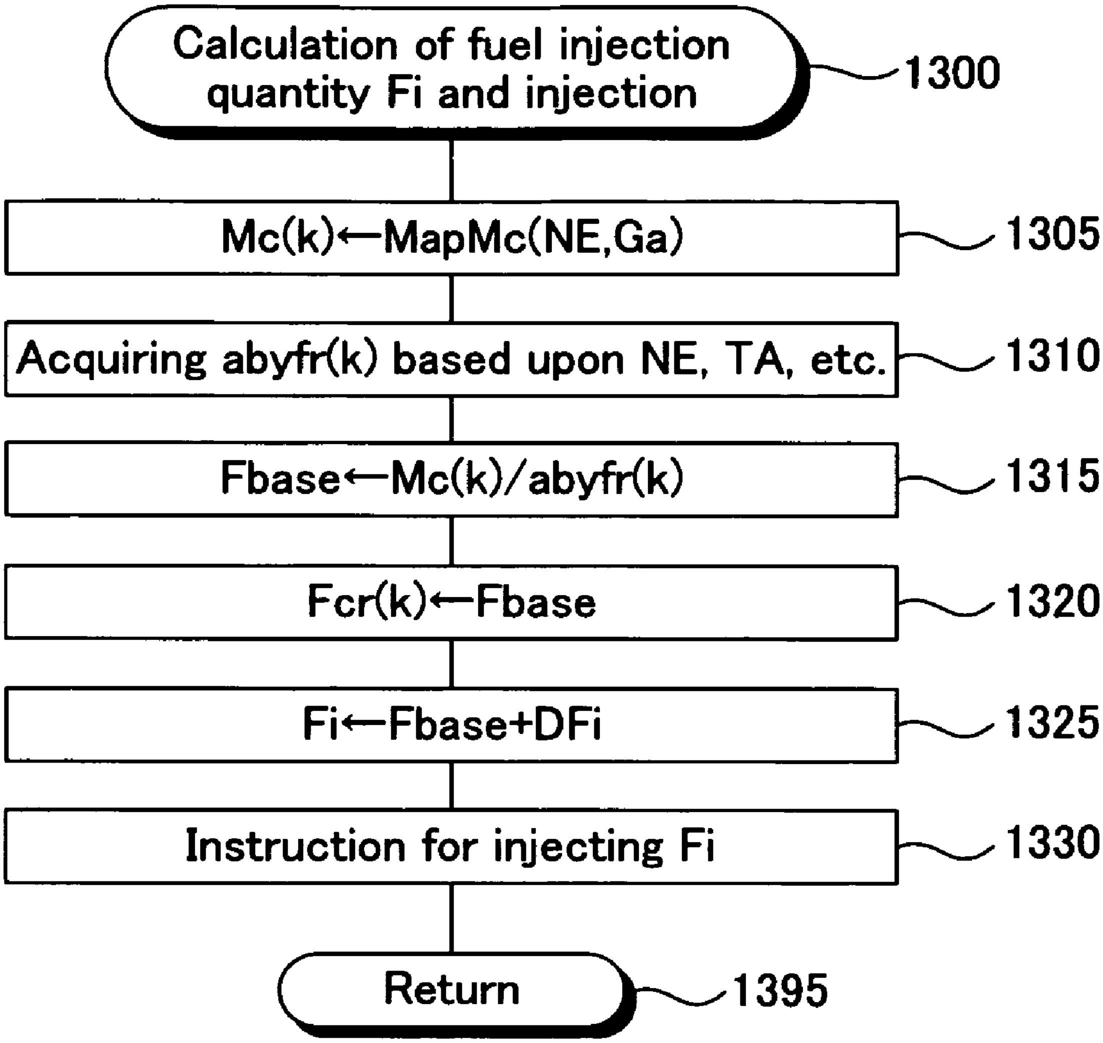
FIG. 13 is a flowchart showing a routine that the CPU shown in FIG. 1 executes so as to calculate a fuel injection quantity and give an instruction of injection.

The CPU 71 repeatedly executes the routine shown by a flowchart in FIG. 13 and adapted to calculate the fuel injection quantity Fi and instruct fuel injection, every time the crank angle of each cylinder reaches a predetermined crank angle before the intake top dead center (e.g., BTDC 90° CA). Accordingly, when the crank angle of an arbitrary cylinder reaches the predetermined crank angle, the CPU 71 starts the processing from step 1300, and proceeds to step 1305, in which the CPU 71 estimates and determines the cylinder intake air quantity Mc(k) this time taken in the cylinder that starts the intake stroke this time (hereinafter sometime referred to as "fuel injection cylinder") on the basis of the table MapMc(NE, Ga).

Subsequently, the CPU 71 proceeds to step 1310 so as to acquire the upstream-side target air-fuel ratio abyfr(k) this time on the basis of the operation speed NE, the throttle valve opening TA, and the like that are the operation state of the internal combustion engine 10. Then, the CPU 71 proceeds to step 1315 so as to determine the base fuel injection quantity Fbase by dividing the cylinder intake air quantity Mc(k) by the upstream-side target air-fuel ratio abyfr(k).

Next, the CPU 71 proceeds to step 1320 so as to set the target cylinder fuel supply quantity Fcr(k) this time to the aforesaid base fuel injection quantity Fbase. The target cylinder fuel supply quantity Fcr(k) is used for obtaining the low-pass filter passed target cylinder fuel supply quantity Fcrlow(k−N) at the later-described routine.

Then, the CPU 71 proceeds to step 1325 so as to determine the fuel injection quantity Fi by adding the latest upstream-side feedback correction value DFi obtained at the later-described routine (at the point of the previous fuel injection) to the base fuel injection quantity Fbase in accordance with the Equation (1).

Then, the CPU 71 proceeds to step 1330 so as to give the instruction for injecting fuel in the fuel injection quantity Fi, and then, proceeds to step 1395 so as to end the present routine for the present. From the above, the base fuel injection quantity Fbase is calculated on the basis of the upstream-side target air-fuel ratio abyfr(k) that changes in accordance with the operation state, and the instruction for injecting the fuel in quantity Fi of the fuel injection, which is obtained by performing the feedback correction to the base fuel injection quantity Fbase, is given to the fuel injection cylinder.

<Calculation of Upstream-Side Feedback Correction Value>

Subsequently, the operation for calculating the upstream-side feedback correction value DFi will be explained. The CPU 71 repeatedly executes the routine shown by a flowchart in FIG. 14, every time the fuel injection starting time (fuel injection starting point) has come for the fuel injection cylinder. Accordingly, when the fuel injection starting time has come for the fuel injection cylinder, the CPU 71 starts the processing from step 1400, and proceeds to step 1405, in which the CPU 71 determines whether the upstream-side feedback condition is established or not. Here, the upstream-side feedback condition is established, for example, when the temperature THW of the cooling water for the engine is not less than a first prescribed temperature, the upstream air-fuel-ratio sensor 66 is normal (including the activated state), and the intake air quantity (load) per one rotation of the engine is not more than a prescribed value.

The description will be continued under the assumption that the upstream-side feedback condition is satisfied presently. The CPU 71 makes "Yes" determination at step 1405, and proceeds to step 1410 so as to obtain the control-use air-fuel ratio abyfs at the present time through the conversion of the output value corresponding to control-use air-fuel ratio (Vabyfs+Vafsfb), which is the sum of the output value Vabyfs from the upstream air-fuel-ratio sensor 66 at the present time and the downstream-side feedback correction value Vafsfb obtained through the routine described later (at the point of the previous fuel injection), on the basis of the table Mapabyfs(Vabyfs+Vafsfb) (see FIG. 2).

Subsequently, the CPU 71 proceeds to step 1415 so as to obtain the control-use cylinder fuel supply quantity Fc(k−N) at the time point N strokes before the present point in time through the division of the cylinder intake air quantity Mc(k−N), which is air quantity of the cylinder that has started an intake stroke at N strokes (N intake strokes) before the present point in time, by the above-mentioned control-use air-fuel ratio abyfs. The latest value obtained at the later-described routine is used as the stroke N.

Next, the CPU 71 proceeds to step 1420 so as to obtain the cylinder fuel supply quantity deviation DFc by subtracting the control-use cylinder fuel supply quantity Fc(k−N) from the low-pass filter passed target cylinder fuel supply quantity Fcrlow(k−N) in accordance with the Equation (4). The latest value obtained at the later-described routine is used as the low-pass filter passed target cylinder fuel supply quantity Fcrlow(k−N). Specifically, the cylinder fuel supply quantity deviation DFc is a quantity that represents the excessiveness/insufficiency of fuel having been supplied to the cylinder at the time point N strokes before the present point in time.

Then, the CPU 71 proceeds to step 1425 so as to obtain the upstream-side feedback correction value DFi in accordance with the equation, corresponding to the Equation (5), described in step 1425. At the successive step 1430, the CPU 71 obtains new integral value SDFc of the cylinder fuel supply quantity deviation by adding the cylinder fuel supply quantity deviation DFc obtained at the step 1420 to the integral value SDFc of the cylinder fuel supply quantity deviation DFc at the present time, and then, proceeds to step 1495 to end the present routine for the present.

In this manner, the upstream-side feedback correction value DFi is obtained on the basis of the difference between the low-pass filter passed target cylinder fuel supply quantity Fcrlow(k−N) and the control-use cylinder fuel supply quantity Fc(k−N), and since the upstream-side feedback correction value DFi is reflected on the fuel injection quantity Fi by the step 1325 in FIG. 13, the air-fuel-ratio feedback control is executed.

On the other hand, when the upstream-side feedback condition is not established at the determination at step 1405, the CPU 71 makes "No" determination at step 1405, and proceeds to step 1435 so as to set the upstream-side feedback correction value DFi to "0", and then, proceeds to step 1440 so as to set the integral value SDFc of the cylinder fuel supply quantity deviation to "0". Thereafter, the CPU 71 proceeds to step 1495 to end the present routine for the present. When the upstream-side feedback condition is not satisfied, the upstream-side feedback correction value DFi is set to "0", and the correction for the air-fuel ratio is not performed as described above.

<Calculation of Downstream-Side Feedback Correction Value>

Figure 15:
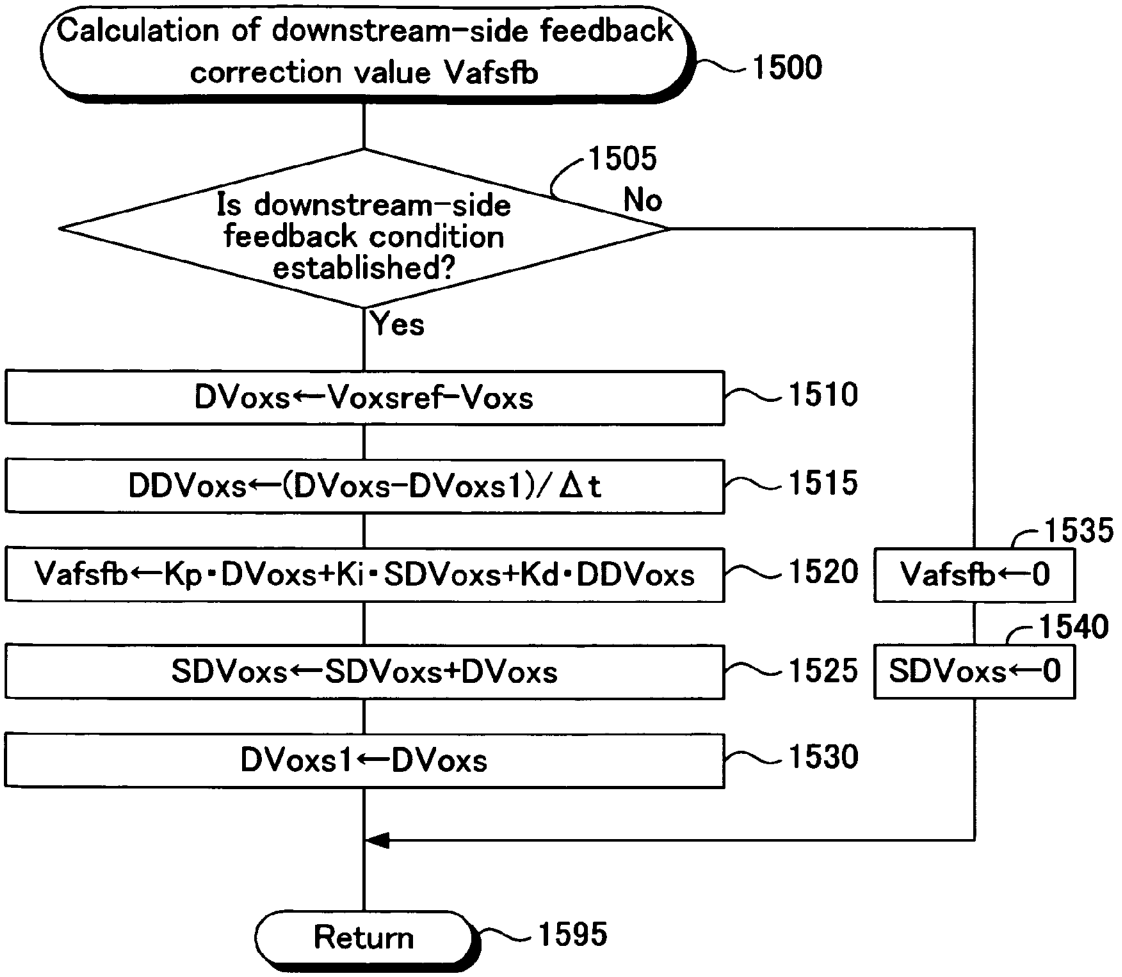
FIG. 15 is a flowchart showing a routine that the CPU shown in FIG. 1 executes so as to calculate a downstream-side feedback correction value.

Subsequently, the operation for calculating the downstream-side feedback correction value Vafsfb will be explained. The CPU 71 repeatedly executes the routine shown by a flowchart in FIG. 15, every time the fuel injection starting time (fuel injection starting point) has come for the fuel injection cylinder. Accordingly, when the fuel injection starting time has come for the fuel injection cylinder, the CPU 71 starts the processing from step 1500, and proceeds to step 1505, in which the CPU 71 determines whether the downstream-side feedback condition is established or not. Here, the downstream-side feedback condition is established, for example, when the temperature THW of the cooling water for the engine is not less than a second prescribed temperature, which is higher than the first prescribed temperature, in addition to the aforesaid upstream-side feedback condition at step 1405.

The description will be continued under the assumption that the downstream-side feedback condition is satisfied presently. The CPU 71 makes "Yes" determination at step 1505, and proceeds to step 1510 so as to obtain the output deviation DVoxs by subtracting the output value Voxs from the downstream air-fuel-ratio sensor 67 at the present time from the downstream-side target value Voxsref in accordance with the Equation (2). Then, the CPU 71 proceeds to step 1515 so as to obtain the differential value DDVoxs of the output deviation DVoxs on the basis of Equation (7) described below.

$$DDVoxs=(DVoxs-DVoxs1)/\Delta t \quad \text{Eq. (7)}$$

In Equation (7), DVoxs1 represents the previous value of the output deviation DVoxs, which has been set (updated) in the later-described step 1530 in the previous execution of the present routine. Further, Δt represents the period from the point of the previous execution of the present routine to the point of the execution of the present routine this time.

Then, the CPU 71 proceeds to step 1520 so as to obtain the downstream-side feedback correction value Vafsfb in accordance with the equation, corresponding to the Equation (3), described in step 1520. This downstream-side feedback correction value Vafsfb is used for obtaining the control-use air-fuel ratio abyfs at step 1410 upon the next execution of the routine shown in FIG. 14.

Subsequently, the CPU 71 proceeds to step 1525 so as to obtain new integral value SDVoxs of the output deviation by adding the output deviation DVoxs obtained at step 1510 to the integral value SDVoxs of the output deviation at that point in time, and at the successive step 1530, the CPU 71 sets the previous value DVoxs1 of the output deviation DVoxs as the output deviation DVoxs obtained at the step 1510, and then, proceeds to step 1595 so as to end the present routine for the present.

On the other hand, when the downstream-side feedback condition is not satisfied at the determination of step 1505, the CPU 71 makes "No" determination at step 1505, and then, proceeds to step 1535 so as to set the downstream-side feedback correction value Vafsfb to "0", and at the successive step 1540, set the integral value SDVoxs of the output deviation to "0". Thereafter, the CPU 71 proceeds to step 1595 so as to end the present routine for the present.

Figure 14:
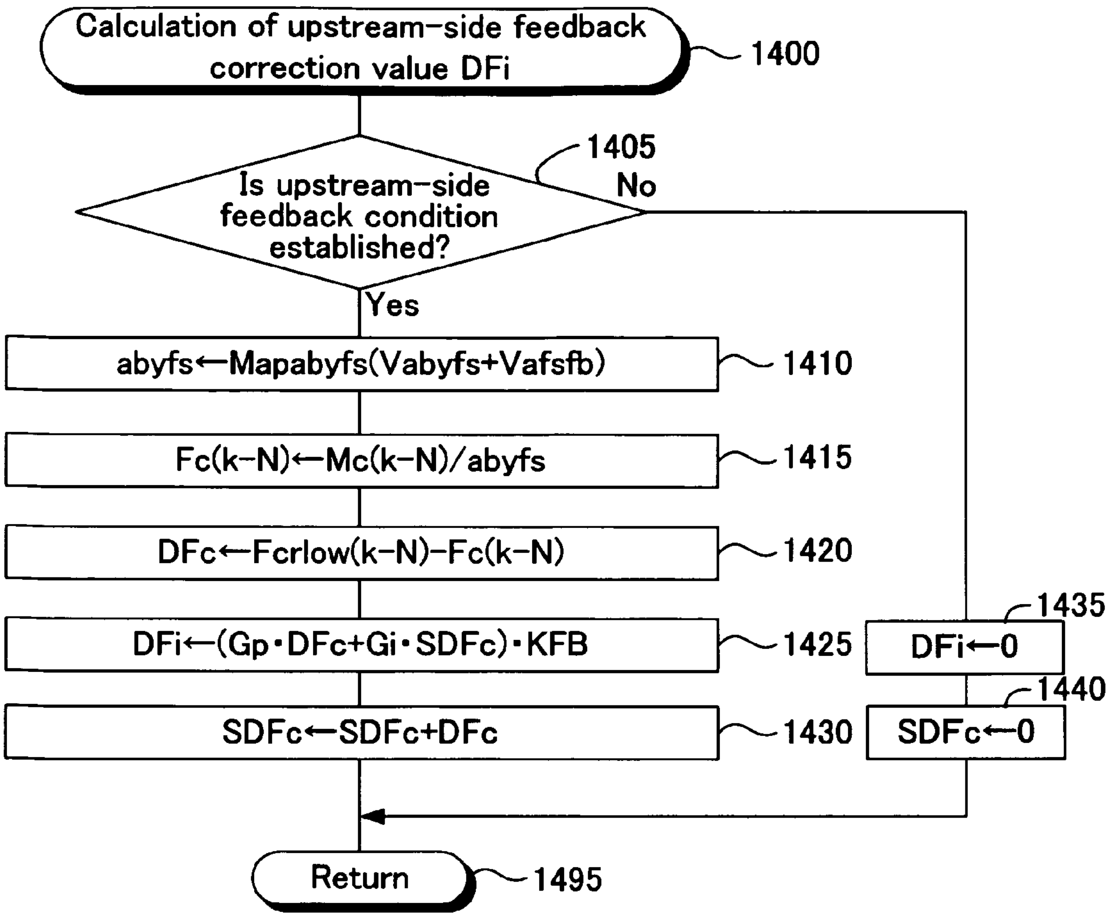
FIG. 14 is a flowchart showing a routine that the CPU shown in FIG. 1 executes so as to calculate an upstream-side feedback correction value.

In this manner, when the downstream-side feedback condition is not satisfied, the downstream-side feedback correction value Vafsfb is set to "0", whereby the output value corresponding to control-use air-fuel ratio at step 1410 in the routine in FIG. 14 becomes equal to the output value Vabyfs from the upstream air-fuel-ratio sensor 66. Specifically, the feedback control of the air-fuel ratio according to the output value Voxs from the downstream air-fuel-ratio sensor 67 is not executed.

<Low-Pass Filter Process>

Subsequently, the operation for performing the low-pass filter process by the low-pass filter A15 (see FIG. 4) that is a digital filter will be explained. The CPU 71 repeatedly executes a routine by a flowchart in FIG. 16 every time an execution interval Δt1 (constant) elapses. The execution interval Δt1 is set shorter than the above-mentioned time Δt (specifically, the shortest Δt) corresponding to the supposed maximum operation speed NE. When a predetermined timing has come, the CPU 71 starts the processing from step 1600, and proceeds to step 1605 so as to determine the time constant τ of the low-pass filter process on the basis of the table Mapτ(Mc(k)) (see FIG. 11).

Then, the CPU 71 proceeds to step 1610 so as to determine the stroke N on the basis of the table MapN(Mc(k)) (see FIG. 7). This stroke N is used for reading the cylinder intake air quantity Mc(k−N) at the time point N strokes before the present point in time at the step 1415 in the above-mentioned routine in FIG. 14 and for reading the target cylinder fuel supply quantity Fcr(k−N) at the time point N strokes before the present point in time at later-described step 1620 in the present routine.

Next, the CPU 71 proceeds to step 1615 so as to acquire the dulling process constant n(≧1) on the basis of the time constant τ and the execution interval Δt1. The dulling process constant n is used in the low-pass filter process executed at the next step 1620. Since the product of the dulling process constant n and the execution interval Δt1 is in proportion to the time constant τ, the dulling process constant n is set to be a greater value as the time constant τ increases.

Subsequently, the CPU 71 proceeds to step 1620 so as to obtain the low-pass filter passed target cylinder fuel supply quantity Fcr(k−N) on the basis of the dulling process constant n, the previous value Fcrlow1 of the low-pass filter passed target cylinder fuel supply quantity Fcr(k−N), the target cylinder fuel supply quantity Fcr(k−N) at the time point N strokes before the present point in time, and the equation described in step 1620. The latest value already updated during the previous execution of the present routine at the later-described step 1625 is used as the previous value Fcrlow1.

Next, the CPU 71 proceeds to step 1625 so as to set (update) the previous value Fcrlow1 of the low-pass filter passed target cylinder fuel supply quantity Fcrlow(k−N) to the low-pass filter passed target cylinder fuel supply quantity Fcrlow(k−N) obtained at the step 1620, and then, proceeds to step 1695 to end the present routine for the present.

From the above, the time constant τ and the stroke N are updated every time the execution interval Δt1 of the present routine elapses, and the low-pass filter passed target cylinder fuel supply quantity Fcrlow(k−N) is acquired by performing the low-pass filter process to the target cylinder fuel supply quantity Fcr(k−N) at the time point N strokes before the present point in time with the time constant τ. The latest value of the low-pass filter passed target cylinder fuel supply quantity Fcrlow(k−N) acquired as described above is used at the step 1420 in the routine shown in FIG. 14, whereby the cylinder fuel supply quantity deviation DFc (accordingly, the upstream-side feedback correction value DFi) is obtained.

As explained above, according to the air-fuel-ratio control apparatus for an internal combustion engine in the embodiment of the present invention, the upstream-side feedback correction value DFi is obtained on the basis of the difference between the low-pass filter passed target cylinder fuel supply quantity Fcrlow(k−N), which is obtained by performing the low-pass filter process with the time constant τ to the target cylinder fuel supply quantity Fcr(k−N) corresponding to the upstream-side target air-fuel ratio abyfr(k−N) at the time point N strokes before (accordingly the dead time L before) the present point in time, and the control-use cylinder fuel supply quantity Fc(k−N) at the time point N strokes before the present point in time, which corresponds to the control-use air-fuel ratio abyfs based upon the output value Vabyfs from the upstream air-fuel-ratio sensor 66 at the present time. This upstream-side feedback correction value DFi is reflected on the fuel injection quantity Fi, whereby the air-fuel-ratio feedback control is executed.

Accordingly, when the upstream-side target air-fuel ratio abyfr(k) changes, the timing of the change in the low-pass filter passed target cylinder fuel supply quantity Fcrlow(k−N) used for the calculation of the upstream-side feedback correction value DFi and the timing of the change in the control-use cylinder fuel supply quantity Fc(k−N) at the time point N strokes before the present point in time coincide with each other. Further, the time constant τ of the low-pass filter process is set to be the value equal to the time constant corresponding to the response delay of the upstream air-fuel-ratio sensor 66. Therefore, the degree of the delay of the change in the low-pass filter passed target cylinder fuel supply quantity Fcrlow(k−N) and the degree of the delay of the change in the control-use cylinder fuel supply quantity Fc(k−N) after the timing of the change coincide with each other. As a result, even if the upstream-side target air-fuel ratio abyfr(k) sharply changes, the temporal increase of the upstream-side feedback correction value DFi is suppressed, with the result that the air-fuel ratio can promptly be converged to the target air-fuel ratio.

The present invention is not limited to the above-described embodiments, and various modifications may be employed without departing from the scope of the invention. For example, in the above-described second embodiment, the stroke N is obtained on the basis of the cylinder intake air quantity Mc(k) and the table MapN (see FIG. 7 and step 1610 in the routine shown in FIG. 16). However, the stroke N may be obtained on the basis of the operation state NE, cylinder intake air quantity Mc(k), and a table that defines the relationship among the stroke N, operation speed NE and cylinder intake air quantity Mc. In this case, instead of determining the stroke N on the basis of the MapN(Mc(k)) at the step 1610 in the routine shown in FIG. 16, the stroke N is determined on the basis of the MapN(NE,Mc(k)).

In the above-mentioned embodiment, the stroke N is used as the number of times of instruction for fuel injection that correspond to the dead time L when the cylinder intake air quantity Mc(k−N) and the target cylinder fuel supply quantity Fcr(k−N) at the time point N strokes before the present point in time are obtained. However, the dead time L itself may be used. In this case, instead of determining the stroke N on the basis of the MapN(Mc(k)) at the step 1610 in the routine shown in FIG. 16, the dead time L may be determined on the basis of the operation state NE, cylinder intake air quantity Mc(k), and a table that defines the relationship among the dead time L, operation speed NE and cylinder intake air quantity Mc. Further, instead of using the cylinder intake air quantity Mc(k−N) at the step 1415 in the routine shown in FIG. 14 and the target cylinder fuel supply quantity Fcr(k−N) at the time point N strokes before the present point in time and at the step 1620 in the routine shown in FIG. 16, the control-use cylinder fuel supply quantity Fc and the low-pass filter passed cylinder fuel supply quantity Fcrlow are obtained by using the latest value of the cylinder intake air quantity Mc and the latest value of the target cylinder fuel supply quantity Fcr that are determined at the time point the dead time L before the present point in time respectively.

Although the time constant τ of the low-pass filter process is obtained on the basis of the cylinder intake air quantity Mc(k) and the table Mapτ in the above-described embodiment (see FIG. 11 and step 1605 in the routine shown in FIG. 16), the time constant τ of the low-pass filter process may be obtained on the basis of the operation speed NE, cylinder intake air quantity Mc(k), and a table that defines the relationship among the time constant τ of the low-pass filter process, operation speed NE and cylinder intake air quantity Mc. In this case, instead of determining the time constant τ of the low-pass filter process on the basis of the Mapτ(Mc(k)) at the step 1605 in the routine shown in FIG. 16, the time constant τ of the low-pass filter process is determined on the basis of the Mapτ(NE, Mc(k)).

Although the time constant τ of the low-pass filter process is obtained on the basis of the cylinder intake air quantity Mc(k) and the table Mapτ in the above-described embodiment, instead of or in addition to the use of only the cylinder intake air quantity Mc(k) as the argument of the table for obtaining the time constant τ of the low-pass filter process, at least one of the open/close timing VT of the intake valve 32, ignition timing CAig, and the upstream-side target air-fuel ratio abyfr(k) may be used.

Figure 16:
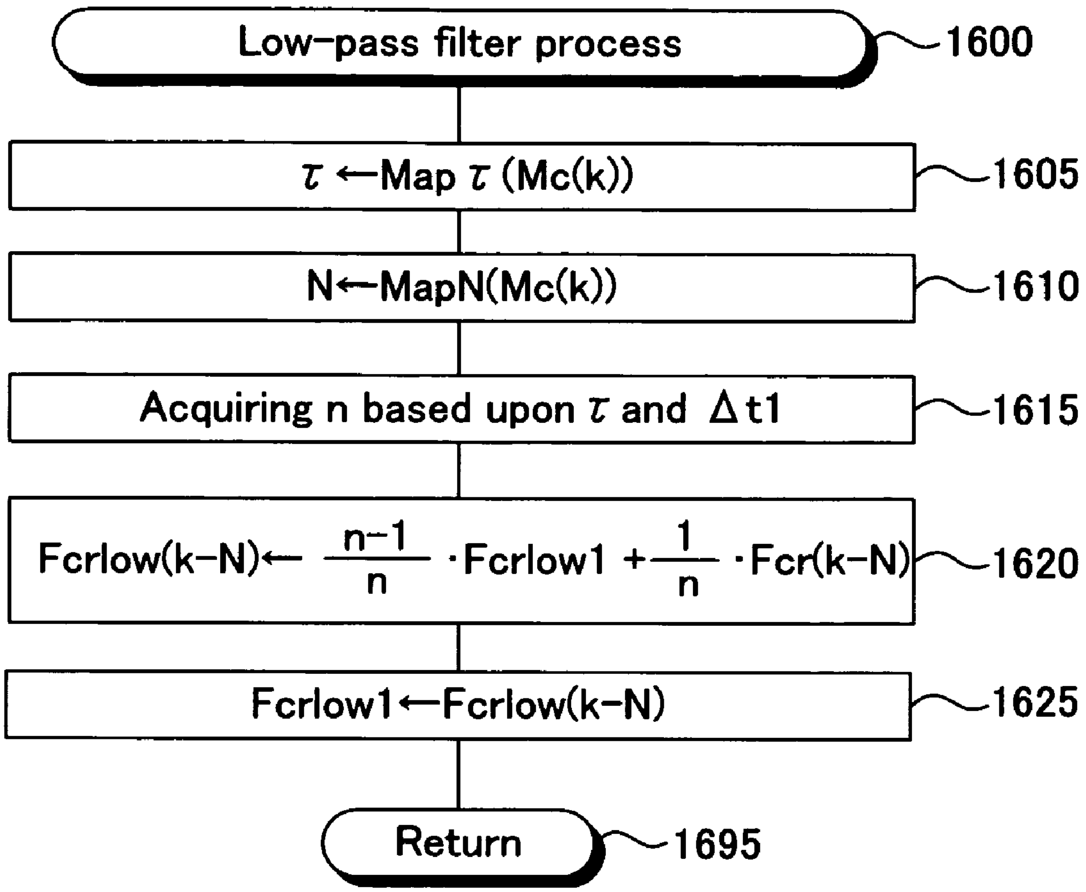
FIG. 16 is a flowchart showing a routine that the CPU shown in FIG. 1 executes so as to perform the low-pass filter process.

Although a first-order filter is used as the low-pass filter A15 (see the Equation (6), and step 1620 in the routine shown in FIG. 16) in order to reduce the number of parameters involved in the responsiveness of the low-pass filter process in the above-described embodiment, a second-order filter may be used as the low-pass filter A15. By virtue of this configuration, the characteristic of the delay of the change in the low-pass filter passed target cylinder fuel supply quantity Fcrlow(k−N) can be precisely made close to the characteristic of the delay of the change in the output value Vabyfs from the upstream air-fuel-ratio sensor 66 when the upstream-side target air-fuel ratio abyfr(k) changes. This is based upon the following reason. Specifically, when the fuel injection quantity Fi changes due to the change in the upstream-side target air-fuel ratio abyfr(k), a fuel adhesion quantity that is the quantity of the fuel adhered on the components (wall surface of the intake pipe 41, and surface of the intake valve 32) constituting the intake passage changes. When the fuel adhesion quantity changes, the change in the quantity of the fuel actually supplied to the combustion chamber 25 is delayed with respect to the change in the fuel injection quantity Fi.

In addition, in the above-described embodiment, the upstream-side feedback correction value DFi is obtained on the basis of the cylinder fuel supply quantity deviation DFc that is the value obtained by subtracting the control-use cylinder fuel supply quantity Fc(k−N) at the time point N strokes before the present point in time from the low-pass filter passed target cylinder fuel supply quantity Fcrlow(k−N). However, the upstream-side feedback correction value DFi may be obtained on the basis of the value obtained by subtracting the value, which is obtained by performing the low-pass filter process to the upstream-side target air-fuel ratio abyfr(k−N) at the time point N strokes before the present point in time, from the control-use air-fuel ratio abyfs(k) this time.

What is claimed is:

1. An air-fuel-ratio control apparatus applied to an internal combustion engine including:

a catalyst unit disposed in an exhaust passage of the internal combustion engine;

upstream air-fuel-ratio sensor disposed in the exhaust passage to be located upstream of the catalyst unit; and fuel injecting means for injecting fuel according to an instruction, the air-fuel-ratio control apparatus comprising:

target air-fuel ratio determining means that determines a target air-fuel ratio that changes in accordance with an operation state of the internal combustion engine;

base fuel injection quantity acquiring means that acquires a base fuel injection quantity that is a quantity of fuel for obtaining the determined target air-fuel ratio;

first delay processing means that acquires a value corresponding to the target air-fuel ratio which has been determined at the point a dead time before the present point in time, the dead time being defined as a period from a time when the instruction for injecting fuel is issued to a time when exhaust gas generated based upon a combustion of the fuel reaches the upstream air-fuel-ratio sensor;

second delay processing means that acquires a value obtained by performing a low-pass filter process to the value acquired by the first delay processing means;

upstream-side feedback correction value calculation means that calculates an upstream-side feedback correction value, which is a feedback correction value for feedback-controlling an air-fuel ratio of gas mixture supplied to the internal combustion engine, on the basis of the value acquired by the second delay processing means and the output value from the upstream air-fuel-ratio sensor;

fuel injection quantity calculation means that calculates a fuel injection quantity on the basis of the acquired base fuel injection quantity and the calculated upstream-side feedback correction value; and air-fuel-ratio control means that feedback-controls the air-fuel ratio of gas mixture, which is supplied to the internal combustion engine, by giving the instruction for injecting the fuel in the calculated fuel injection quantity to the fuel injecting means.

2. An air-fuel-ratio control apparatus for an internal combustion engine according to claim 1, wherein the first delay processing means is configured to change the dead time in accordance with the operation state of the internal combustion engine.

3. An air-fuel-ratio control apparatus for an internal combustion engine according to claim 2, wherein the first delay processing means is configured to use, as the operation state of the internal combustion engine, an operation speed of the internal combustion engine and a quantity of air taken in a combustion chamber of the internal combustion engine.

4. An air-fuel-ratio control apparatus for an internal combustion engine according to claim 2, wherein the first delay processing means is configured to use, as the point the dead time before the present point in time, the point, which the instruction for injecting fuel is issued, before the present point in time by a number of times of the instruction for fuel injection that corresponds to the dead time, and to determine the number of times of the instruction for injecting fuel that corresponds to the dead time on the basis of the operation speed of the internal combustion engine and a quantity of air taken in a combustion chamber of the internal combustion engine.

5. An air-fuel-ratio control apparatus for an internal combustion engine according to claim 2, wherein the first delay processing means is configured to use, as the point the dead time before the present point in time, the point, which the instruction for injecting fuel is issued, before the present point in time by a number of times of the instruction for injecting fuel that corresponds to the dead time, and to determine the number of times of the instruction for fuel injection that corresponds to the dead time based only upon a quantity of air taken in a combustion chamber of the internal combustion engine.

6. An air-fuel-ratio control apparatus for an internal combustion engine according to claim 1, wherein the second delay processing means is configured to change a parameter relating to a responsiveness of the low-pass filter process in accordance with the operation state of the internal combustion engine.

7. An air-fuel-ratio control apparatus for an internal combustion engine according to claim 6, wherein the second delay processing means is configured to use, as the operation state of the internal combustion engine, an operation speed of the internal combustion engine and a quantity of air taken in a combustion chamber of the internal combustion engine.

8. An air-fuel-ratio control apparatus for an internal combustion engine according to claim 6, wherein the second delay processing means is configured to use only a quantity of air taken in a combustion chamber of the internal combustion engine as the operation state of the internal combustion engine.

9. An air-fuel-ratio control apparatus for an internal combustion engine according to claim 1, wherein the second delay processing means is configured to use a second-order delay process as the low-pass filter process.

10. An air-fuel-ratio control apparatus for an internal combustion engine according to claim 1, wherein the second delay processing means is configured to use a first-order delay process as the low-pass filter process.

* * * * *